US012745268B2

(12) United States Patent
Noh et al.

(10) Patent No.: US 12,745,268 B2
(45) Date of Patent: Sep. 22, 2026

(54) RESOURCE MANAGEMENT METHOD AND DEVICE IN WIRELESS COMMUNICATION SYSTEM

(71) Applicant: ELECTRONICS AND TELECOMMUNICATIONS RESEARCH INSTITUTE, Daejeon (KR)

(72) Inventors: Hoon Dong Noh, Daejeon (KR); Moon Sik Lee, Daejeon (KR); Jae Seung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 518 days.

(21) Appl. No.: 18/257,582

(22) PCT Filed: Dec. 15, 2021

(86) PCT No.: PCT/KR2021/019131
§ 371 (c)(1),
(2) Date: Jun. 14, 2023

(87) PCT Pub. No.: WO2022/131804
PCT Pub. Date: Jun. 23, 2022

(65) Prior Publication Data

US 2024/0155652 A1 May 9, 2024

(30) Foreign Application Priority Data

Dec. 15, 2020 (KR) ........................ 10-2020-0175772
Aug. 23, 2021 (KR) ........................ 10-2021-0111100
Dec. 15, 2021 (KR) ........................ 10-2021-0180169

(51) Int. Cl.
*H04W 72/27* (2023.01)
*H04W 16/28* (2009.01)
(Continued)

(52) U.S. Cl.
CPC .......... *H04W 72/27* (2023.01); *H04W 16/28* (2013.01); *H04W 72/0446* (2013.01); *H04W 72/0453* (2013.01)

(58) Field of Classification Search
CPC . H04W 72/27; H04W 16/28; H04W 72/0446; H04W 72/0453
See application file for complete search history.

(56) References Cited

U.S. PATENT DOCUMENTS 9,154,352 B2 10/2015 Palanki et al.
9,763,151 B2 9/2017 Kim
(Continued)

FOREIGN PATENT DOCUMENTS

CN 112075097 A 12/2020
WO 2020032580 A1 2/2020

OTHER PUBLICATIONS

CEWIT. Discussion on enhancements to resource multiplexing between child and parent links of an IAB node. R1-2006329, 3GPP TSG-RAN WG1 #102-e. Aug. 8, 2020.
(Continued)

*Primary Examiner* — Duc C Ho
(74) *Attorney, Agent, or Firm* — Rabin & Berdo, P.C.

(57) ABSTRACT

A resource management method carried out by an integrated access and backhaul (IAB) node in a communication system, according to one embodiment of the present invention, may comprise the steps of: receiving, from an upper-level node of an IAB node, a first upper layer signaling signal for resource configuration of the IAB node; receiving, from the upper-level node of the IAB node, a second upper layer signaling signal for resource configuration of the IAB node; and, on the basis of the first and second upper layer signaling signals, determining that an IAB-mobile terminal (IAB-MT) and an IAB-distributed unit (IAB-DU) constituting the IAB node carry out communication by being multiplexed by any
(Continued)

one scheme among time division, frequency division and spatial division.

20 Claims, 14 Drawing Sheets

(51) Int. Cl.
*H04W 72/0446* (2023.01)
*H04W 72/0453* (2023.01)

(56) References Cited

U.S. PATENT DOCUMENTS

| | | | | |
|---|---|---|---|---|
| 10,206,232 | B2 | 2/2019 | Novlan et al. | |
| 11,503,586 | B2 | 11/2022 | Jo et al. | |
| 2016/0360545 | A1 | 12/2016 | Khandekar et al. | |
| 2019/0280847 | A1 | 9/2019 | Kim et al. | |
| 2020/0107383 | A1* | 4/2020 | Novlan | H04B 7/06952 |
| 2021/0127293 | A1 | 4/2021 | Hong | |
| 2022/0070104 | A1* | 3/2022 | Luo | H04B 7/15542 |
| 2023/0092424 | A1* | 3/2023 | Novlan | H04W 72/56 370/329 |

OTHER PUBLICATIONS

ERICSSON. Remaining issue on IAB resource configuration and multiplexing. R1-1912133, 3GPP TSG-RAN WG1 #99. Nov. 8, 2019.

Intel Corporation. Discussion on IAB Backhaul DL Power Control. R1-2005894, 3GPP TSG-RAN WG1 #102-e. Aug. 8, 2020.

Nokia et al. Enhancements for resource multiplexing among IAB backhaul and access links. R1-2008863, 3GPP TSG-RAN WG1 #103-e. Nov. 1, 2020.

ZTE et al. Discussion on IAB Duplexing enhancements. R3-206564, 3GPP TSG-RAN WG3 #110-e. Oct. 23, 2020.

* cited by examiner

FIG. 10

| | | | | | | | | |
|---|---|---|---|---|---|---|---|---|
| CORESET pool ID | serving cell ID | | | | | BWP ID | | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8}$ | Oct N |

RESOURCE MANAGEMENT METHOD AND DEVICE IN WIRELESS COMMUNICATION SYSTEM

TECHNICAL FIELD

The present disclosure relates to a resource management technique in a wireless communication system, and more particularly, to a resource management technique in a wireless communication system to which an integrated access and backhaul (IAB) network is applied.

BACKGROUND ART

With the development of information and communication technology, various wireless communication technologies have been developed. Typical wireless communication technologies include long term evolution (LTE) and new radio (NR), which are defined in the $3^{rd}$ generation partnership project (3GPP) standards. The LTE may be one of 4th generation (4G) wireless communication technologies, and the NR may be one of 5th generation (5G) wireless communication technologies.

In the communication technologies for the 5G or later generation, a higher data rate, larger communication capacity, lower latency, wider coverage, and the like may be required than in the communication technologies of the previous generations. In order to achieve such the requirements, an integrated access and backhaul (IAB) network technology is being studied. An IAB node constituting the IAB network may be composed of two elements: a distributed unit (i.e., IAB-DU) and a mobile terminal (i.e., IAB-MT).

In an exemplary embodiment of the communication system, the IAB node may be designed based on a time division multiplexing (TDM) scheme between the IAB-DU and the IAB-MT. In the IAB node designed based on the TDM scheme between the IAB-DU and the IAB-MT, radio resources such as time and/or frequency resources may be allocated to the IAB-DU and/or the IAB-DU based on the TDM scheme.

On the other hand, in order to satisfy high communication performance requirements of the communication system, the IAB node may need to be designed to support a multiplexing scheme that allows simultaneous transmissions instead of the TDM scheme. Here, the multiplexing scheme allowing simultaneous transmissions may mean a frequency division multiplexing (FDM) scheme, a spatial division multiplexing (SDM) scheme, or the like. A resource management technique for efficiently allocating radio resources in the IAB node designed to support the TDM scheme and/or the multiplexing scheme allowing simultaneous transmissions may be required.

Matters described as the prior arts are prepared to promote understanding of the background of the present disclosure, and may include matters that are not already known to those of ordinary skill in the technology domain to which exemplary embodiments of the present disclosure belong.

DISCLOSURE

Technical Problem

The present disclosure is directed to providing a method and an apparatus of efficiently performing radio resource allocation for an IAB node designed for supporting a TDM scheme and/or a multiplexing scheme allowing simultaneous transmissions in a wireless communication system to which an IAB network is applied.

Technical Solution

According to an exemplary embodiment of the present disclosure for achieving the objective, a resource management method performed by an integrated access and backhaul (IAB) node in a communication system may comprise: receiving, from an upper node of the IAB node, a first higher layer signaling signal for resource configuration of the IAB node; receiving, from the upper node of the IAB node, a second higher layer signaling signal for resource configuration of the IAB node; and determining an IAB-mobile terminal (MT) and an IAB-distributed unit (DU) constituting the IAB node to perform communications by being multiplexed using one of a time division scheme, a frequency division scheme, and a spatial division scheme, based on the first and second higher layer signaling signals.

The first higher layer signaling signal may include at least one of information on a communication direction configured for the IAB-MT, or information on a communication direction configured for the IAB-DU at a specific time point in a time domain, and the communication direction may include at least one of downlink (DL), uplink (UL), flexible, or a combination thereof.

The first higher layer signaling signal may include a hard/soft/not-available (HSNA) configuration configured for the IAB-MT, or an HSNA configuration configured for the IAB-DU at a specific time point in a time domain.

The second higher layer signaling signal may include information on a simultaneous operation (SO) scheme of the IAB-DU and the IAB-MT.

The information on the simultaneous operation scheme may include one of: a first case in which both the IAB-DU and the IAB-MT perform transmissions; a second case in which both the IAB-DU and the IAB-MT perform receptions; a third case in which the IAB-DU performs reception and the IAB-MT performs transmission; a fourth case in which the IAB-DU performs transmission and the IAB-MT performs reception; a fifth case in which radio resources used by the IAB-DU and the IAB-MT are multiplexed in the frequency division scheme; and a sixth case in which radio resources used by the IAB-DU and the IAB-MT are multiplexed in the spatial division scheme.

The second higher layer signaling signal may include at least one of a hard/soft/not-available (HSNA) configuration configured for the IAB-MT, or an HSNA configuration configured for the IAB-DU at a specific time point in a time domain and at a specific position in a frequency domain.

The resource management method may further comprise, after the receiving of the second higher layer signaling signal, receiving, from the upper node, at least one physical layer signaling signal for resource configuration of the IAB node, wherein in the determining, the IAB-MT and the IAB-DU may be determined to perform communications by being multiplexed, based on the first and second higher layer signaling signals and the at least one physical layer signaling signal.

The at least one physical layer signaling signal may include at least one of resource configuration information configured for the IAB-MT or resource configuration information configured for the IAB-DU, and the resource configuration information may include information of an availability indicator (AI) for a soft resource of the IAB-MT or the IAB-DU.

The information on the AI for the soft resource may be included in a predetermined DCI format, and may include information on availability of at least one of a DL soft resource, a UL soft resource, a flexible soft resource, or a simultaneous operation (SO) soft resource.

The information of the AI for the soft resource may include information related to one of an HSNA configuration included in the first higher layer signaling signal or an HSNA configuration included in the second higher layer signaling signal. According to another exemplary embodiment of the present disclosure for achieving the objective, a resource management method performed by a first communication node in a communication system may comprise: transmitting, to an integrated access ad backhaul (IAB) node that is a lower node of the first communication node, a first higher layer signaling signal for resource configuration of the IAB node; and transmitting, to the IAB node, a second higher layer signaling signal for resource configuration of the IAB node, wherein the first and second higher layer signaling signals include information for the IAB node to control an IAB-mobile terminal (MT) and an IAB-distributed unit (DU) constituting the IAB node to perform communications by being multiplexed using one of a time division scheme, a frequency division scheme, and a spatial division scheme.

The first higher layer signaling signal may include at least one of information on a communication direction configured for the IAB-MT, or information on a communication direction configured for the IAB-DU at a specific time point in a time domain, and the communication direction may include at least one of downlink (DL), uplink (UL), flexible, or a combination thereof.

The first higher layer signaling signal may include a hard/soft/not-available (HSNA) configuration configured for the IAB-MT, or an HSNA configuration configured for the IAB-DU at a specific time point in a time domain.

The second higher layer signaling signal may include information on a simultaneous operation (SO) scheme of the IAB-DU and the IAB-MT.

The information on the simultaneous operation scheme may include one of: a first case in which both the IAB-DU and the IAB-MT perform transmissions; a second case in which both the IAB-DU and the IAB-MT perform receptions; a third case in which the IAB-DU performs reception and the IAB-MT performs transmission; a fourth case in which the IAB-DU performs transmission and the IAB-MT performs reception; a fifth case in which radio resources used by the IAB-DU and the IAB-MT are multiplexed in the frequency division scheme; and a sixth case in which radio resources used by the IAB-DU and the IAB-MT are multiplexed in the spatial division scheme.

The second higher layer signaling signal may include at least one of a hard/soft/not-available (HSNA) configuration configured for the IAB-MT, or an HSNA configuration configured for the IAB-DU at a specific time point in a time domain and at a specific position in a frequency domain.

The resource management method may further comprise, after the transmitting of the second higher layer signaling signal, transmitting, to the IAB node, at least one physical layer signaling signal for resource configuration of the IAB node.

The at least one physical layer signaling signal may include at least one of resource configuration information configured for the IAB-MT or resource configuration information configured for the IAB-DU, and the resource configuration information may include information of an availability indicator (AI) for a soft resource of the IAB-MT or the IAB-DU.

The information on the AI for the soft resource may be included in a predetermined DCI format, and may include information on availability of at least one of a DL soft resource, a UL soft resource, a flexible soft resource, or a simultaneous operation (SO) soft resource.

The information of the AI for the soft resource may include information related to one of an HSNA configuration included in the first higher layer signaling signal or an HSNA configuration included in the second higher layer signaling signal.

Advantageous Effects

According to an exemplary embodiment of the present disclosure, an IAB-MT and an IAB-DU included in an IAB node may perform communications with an upper node and a lower node, respectively, according to the TDD scheme or the simultaneous operation scheme. The upper node such as an IAB donor of the IAB node may deliver, to the IAB node, resource configuration information (or resource indicator) indicating information of resources allocated for each of the IAB-DU and the IAB-MT in form of the TDM scheme, FDM scheme, SDM scheme, and/or the like. Signals such as a DCI, F1AP, and/or the like may be extended and used for transmission of the resource configuration information (or resource indicator) delivered from the upper node of the IAB node to the IAB node. Accordingly, the efficiency of communications through the IAB node can be improved, the coverage thereof can be expanded, and the communication capacity thereof can be increased.

DESCRIPTION OF DRAWINGS

FIG. 10 is a conceptual diagram illustrating an exemplary embodiment of a TCI state activation/deactivation MAC CE in a communication system.

BEST MODE OF THE INVENTION

Figure 1:
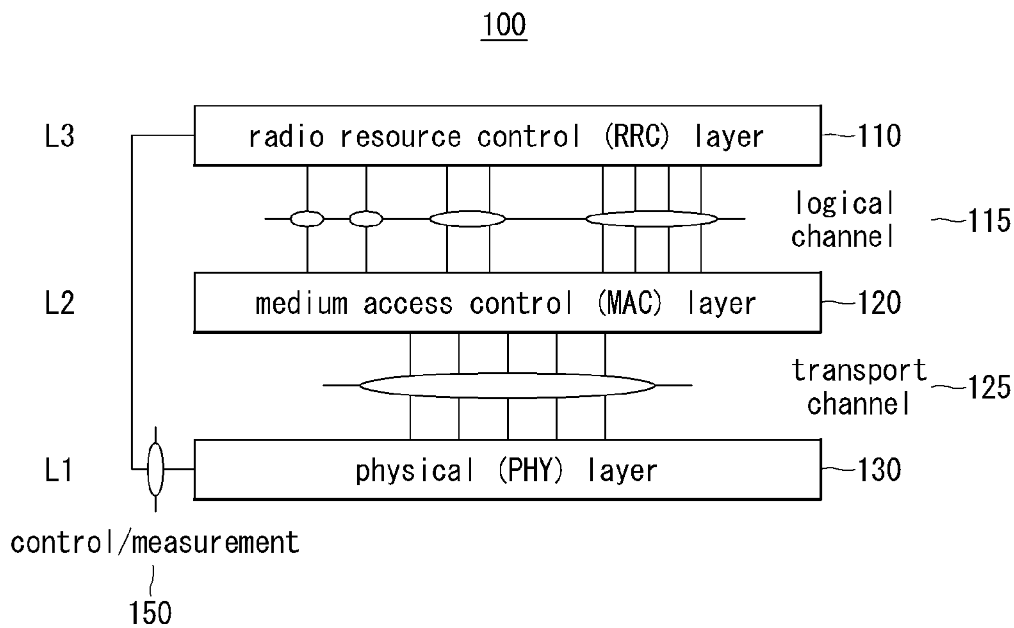
FIG. 1 is a conceptual diagram illustrating an exemplary embodiment of a radio interface protocol structure in a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure. Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the term 'communication system' may be used in the same sense as a 'communication network'.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a radio interface protocol structure in a communication system.

Referring to FIG. 1, an exemplary embodiment of a radio interface protocol structure 100 of a communication system may be configured to include a radio resource control (RRC) layer 110, a medium access control (MAC) layer 120, a physical (PHY) layer 130, and the like. An exemplary embodiment of the radio interface protocol structure 100 shown in FIG. 1 may correspond to various exemplary embodiments of interfaces such as an interface between a terminal and a base station, an interface between an IAB-node distributed unit (IAB-DU) and an IAB-node mobile terminal (IAB-MT) of an integrated access backhaul (IAB) network, an interface between an IAB-DU and a lower node, an interface between an IAB-MT and an upper node, an interface between a plurality of terminals, and the like.

In the vicinity of the PHY layer 130, the RRC layer 110, and the MAC layer 120, and the like may be disposed above the PHY layer 130. For example, the MAC layer 120 may be disposed above the PHY layer 130. The RRC layer 110 may be disposed above the MAC layer 120.

The MAC layer 120 may be connected to a higher layer (e.g., RRC layer 110) through logical channels 115. The PHY layer 130 may be connected to the higher MAC layer 120 through transport channels 125. The PHY layer 130 may transmit and receive control information or measurement information 150 to and from the RRC layer 110.

The PHY layer 130 may be referred to as a 'layer 1' or 'L1'. The MAC layer 120 may be referred to as a 'layer 2' or 'L2'. The RRC layer 110 may be referred to as a 'layer 3' or 'L3'. The RRC layer 110 and the MAC layer 120 may be collectively referred to as the 'higher layer'.

In the present disclosure, 'L1 signaling' refers to signaling such as downlink control information (DCI) transmitted on a physical downlink control channel (PDCCH), uplink control information (UCI) transmitted on a physical uplink control channel (PUCCH), and sidelink control information (SCI) transmitted on a physical sidelink control channel (PSCCH), which are channels of the PHY layer 130. Similarly, in the present disclosure, 'higher layer signaling' may include L2 signaling transmitted through a MAC control element (CE), L3 signaling transmitted through RRC signaling, and the like. Although omitted in FIG. 1 for convenience of description, information that can be included in an interface between base stations, or an interface (e.g., F1, next generation (NG) interfaces, etc.) between base station components such as a distributed unit (DU) and a central unit (CU) may also be collectively referred to as higher layer signaling as well as the L2 signaling or L3 signaling.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is merely an example for the convenience of description, and exemplary embodiments of the numerologies used in the communication system may not be limited thereto. Each numerology μ may correspond to information of a subcarrier spacing (SCS) Δf and a cyclic prefix (CP). The terminal may identify a numerology μ and a CP value applied to a downlink bandwidth part (BWP) or an uplink BWP based on higher layer parameters such as subcarrierSpacing, cyclicPrefix, and/or the like.

Figure 2:
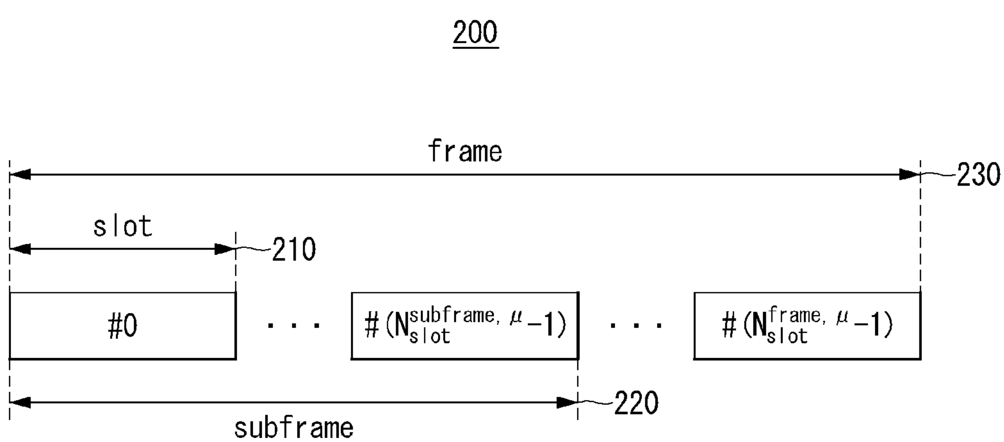
FIG. 2 is a conceptual diagram illustrating an exemplary embodiment of time resources in which radio signals are transmitted in a communication system.

FIG. 2 is a conceptual diagram illustrating an exemplary embodiment of time resources in which radio signals are transmitted in a communication system.

Referring to FIG. 2, time resources in which radio signals are transmitted in a communication system 200 may be represented with a frame 220 comprising one or more $$\left(N_{slot}^{frame,\mu} / N_{slot}^{subframe,\mu}\right)$$

subframes, a subframe 220 comprising one or more $$\left(N_{slot}^{subframe,\mu}\right)$$

slots, and a slot 210 comprising 14

$$\left(N_{symb}^{slot}\right)$$

OFDM symbols. In this case, according to a configured numerology, as the values of $$N_{symb}^{slot},\ N_{slot}^{subframe,\mu},\ \text{and}\ N_{slot}^{frame,\mu},$$

values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
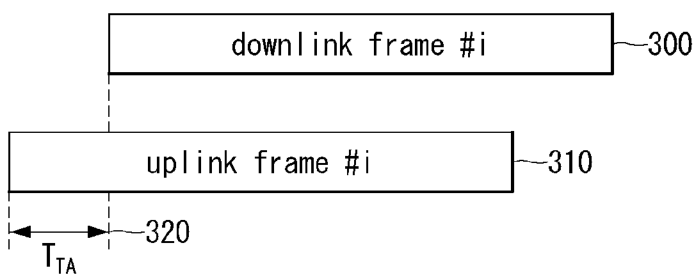
FIG. 3 is a conceptual diagram illustrating a time difference between a reception timing of an i-th downlink frame and a transmission timing of an i-th uplink frame in an exemplary embodiment of a communication system.

In the 5G NR communication system, the frame 230 may have a length of 10 ms, and the subframe 220 may have a length of 1 ms. Each frame 230 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames). FIG. 3 is a conceptual diagram illustrating a time difference between a reception timing of an i-th downlink frame and a transmission timing of an i-th uplink frame in an exemplary embodiment of a communication system.

Referring to FIG. 3, a time difference between a reception timing of an i-th downlink frame 300 and a transmission timing of an i-th uplink frame 310 may be a TTA 320. Accordingly, the terminal may start transmission of the uplink frame #i 310 at a time earlier by TTA compared to the reception timing of the downlink frame #i 300. TTA may be referred to as a timing advance or timing adjustment TA. The base station may instruct the terminal to change a value of TTA through higher layer signaling or L1 signaling, and may configure the terminal to apply TTA in a manner defined as $T_{TA}=(N_{TA}+N_{TA,offset})T_c$. In the case of 5G NR, $T_c$ may be defined as $$T_c = \frac{1}{(\Delta f_{max} \cdot N_f)},$$

$\Delta f_{max}$ may be defined as $\alpha f_{max}$=480 kHz, $N_f$ may be defined as $N_f$=4096, $N_{TA,offset}$ may be a value set by L3 signaling, and $N_{TA}$ may be a value determined by Equation 1 below by a value $T_A$ indicated by L2 signaling.

$$N_{TA} = \begin{cases} T_A \cdot 16 \cdot \frac{64}{2^\mu} \text{(for random access response)} \\ N_{TA\_old} + \left((T_A - 31) \cdot 16 \cdot 64/2^\mu\right) \text{(for other cases)} \end{cases} \quad \text{[Equation 1]}$$

Here, the description on $N_{TA,offset}$ and $N_{TA}$ may be an example for a specific situation, and various other options may exist, but in order not to obscure the gist of the description, all possible cases may not be listed in the present disclosure.

Figure 4:
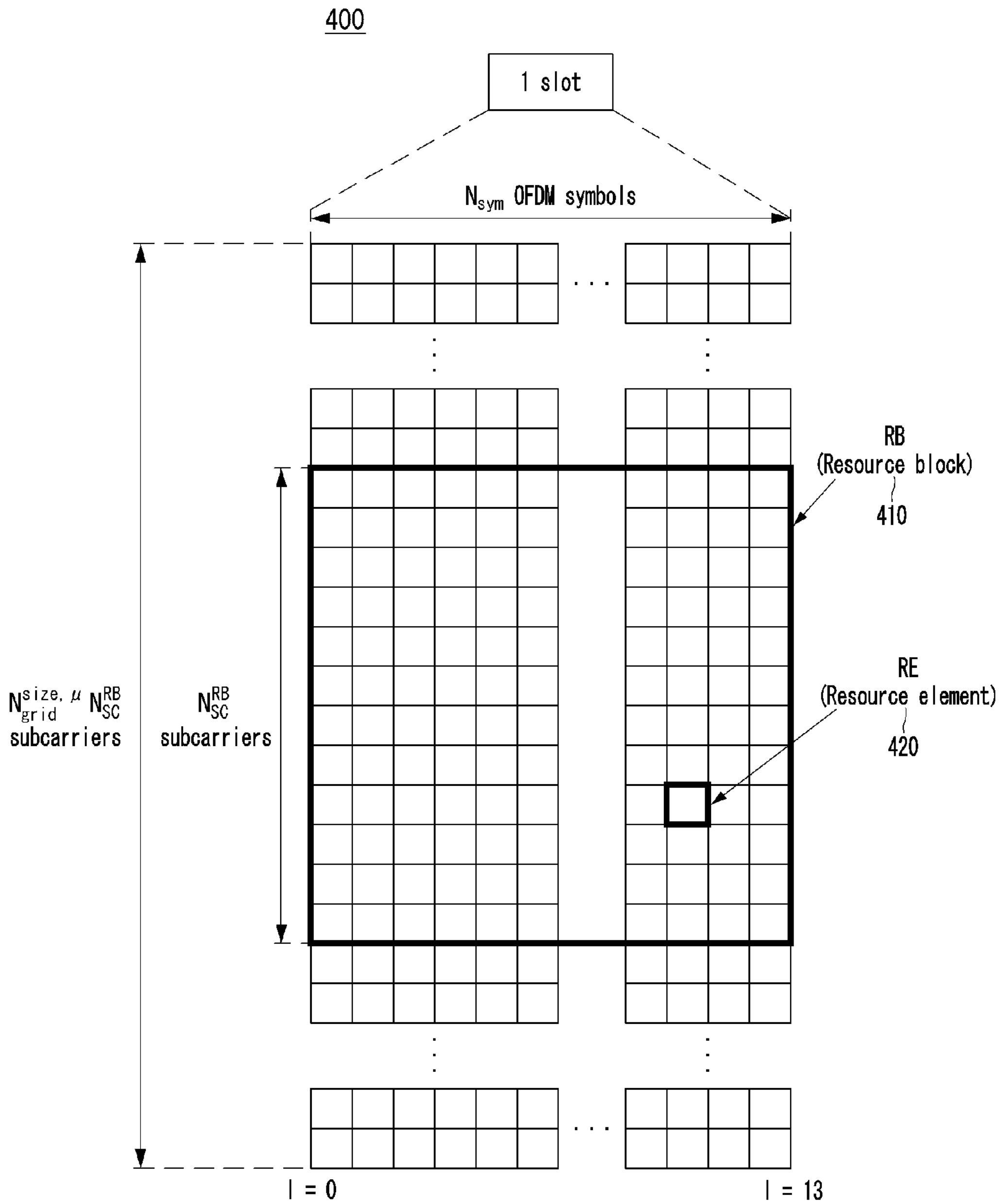
FIG. 4 is a conceptual diagram illustrating an exemplary embodiment of a time/frequency resource grid of a communication system.

FIG. 4 is a conceptual diagram illustrating an exemplary embodiment of a time/frequency resource grid of a communication system.

Referring to FIG. 4, a time/frequency resource grid 400 of a communication system may have $$N_{grid}^{size,\mu} N_{sc}^{RB}$$

subcarriers and $$N_{slot}^{subframe,\mu}$$

OFDMs. The resource grid may be defined for each numerology and each carrier. In this case, $$N_{grid}^{start,\mu}$$

may mean a position of a common resource block (CRB) indicated by higher layer signaling.

$$N_{grid}^{size,\mu}$$

may mean the number of resource blocks (RBs) starting from the CRB, that is, a carrier bandwidth.

$$N_{grid}^{start,\mu}$$

and/or $$N_{grid}^{size,\mu}$$

may have different values for each link direction (e.g., uplink, downlink, or sidelink) or for each numerology μ. Here, the numerology u may be referred to by other terms, such as a SCS configuration, if necessary.

Each element in the resource grid for an antenna port p and a SCS configuration u may be referred to as a resource element (RE) 420, and may be uniquely defined for each position $(k, l)_{p,\mu}$. In this case, k may be a frequency axis index, and l may indicate a symbol position on the time axis. $RE(k, l)_{p,\mu}$ may correspond to a physical resource used to transmit a physical channel or a signal complex value $$a_{k,l}^{(p,\mu)}.$$

One RB 410 may be defined as consecutive $$N_{sc}^{RB} = 12$$

subcarriers on the frequency axis.

The 5G NR communication system has introduced the concept of BWPs in order to reduce high implementation complexity and power consumption of terminals due to the widened carrier bandwidth compared to the 3G/4G communication system. One BWP may be composed of contiguous CRBs, a starting RB position $$N_{BWP,i}^{start,\mu}$$

of the BWP and the number $$N_{BWP,i}^{size,\mu}$$

of RBs constituting the BWP may satisfy Equations 2 and 3.

$$N_{grid,x}^{start,\mu} \leq N_{BWP,i}^{start,\mu} < N_{grid,x}^{start,\mu} + N_{grid,x}^{size,\mu} \quad \text{[Equation 2]}$$

$$N_{grid,x}^{start,\mu} < N_{BWP,i}^{start,\mu} + N_{BWP,i}^{size,\mu} \leq N_{grid,x}^{start,\mu} + N_{grid,x}^{size,\mu} \quad \text{[Equation 3]}$$

The terminal may be configured with up to four downlink BWPs within one component carrier (CC), and only one downlink BWP may be activated at a time. The terminal may not receive a physical downlink shared channel (PDSCH), a physical downlink control channel (PDCCH), a channel state information reference signal (CSI-RS), or the like outside the activated BWP.

The terminal may be configured with up to four uplink BWPs within one CC, and only one uplink BWP may be activated at a time. The terminal may not transmit a physical uplink shared channel (PUSCH), a physical uplink control channel (PUCCH), a sounding reference signal (SRS), or the like outside the activated BWP.

Figure 5:
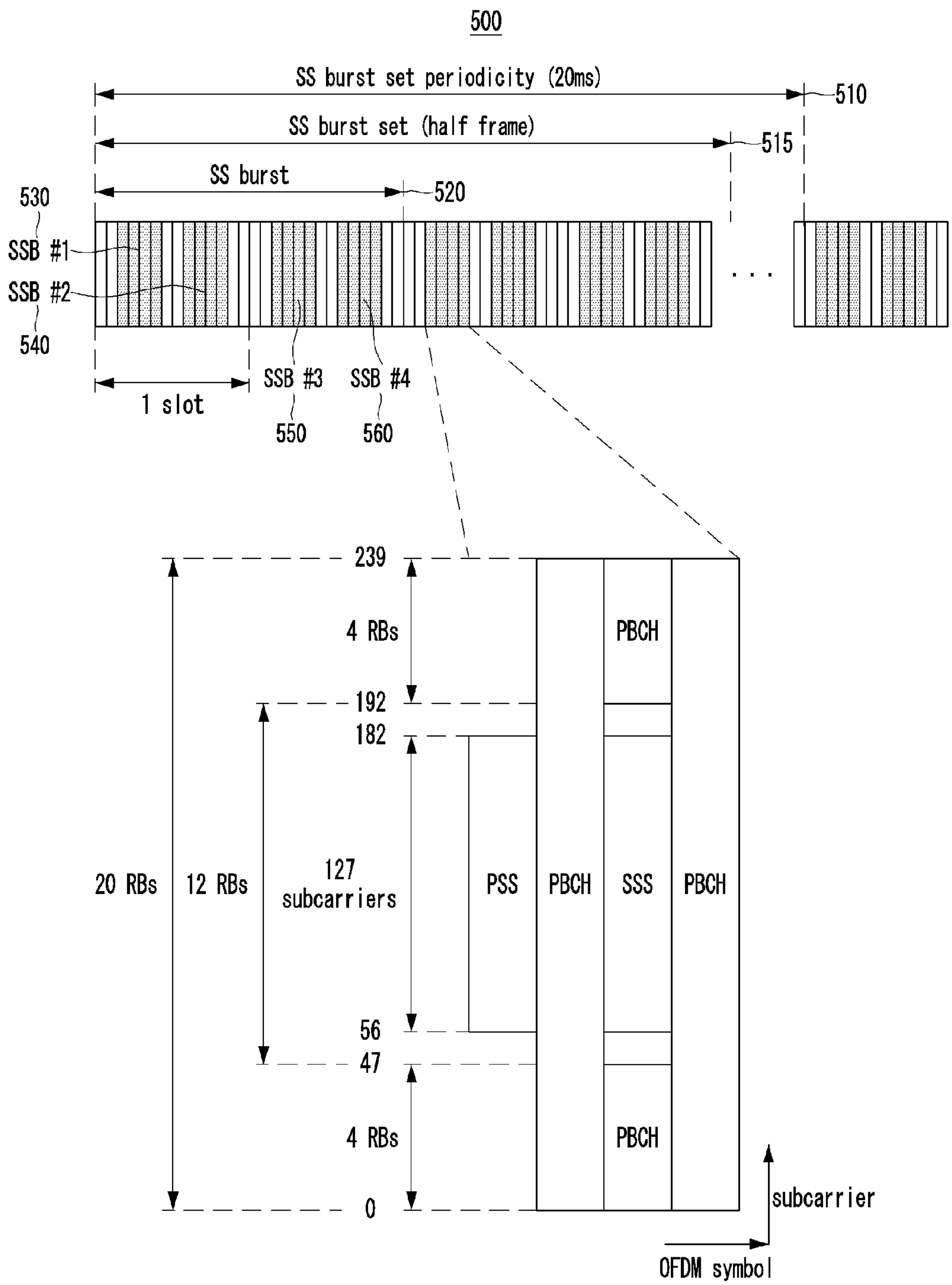
FIG. 5 is a conceptual diagram illustrating an exemplary embodiment of a synchronization signal and physical broadcast channel (SS/PBCH) block or synchronization signal block (SSB) of a communication system.

FIG. 5 is a conceptual diagram illustrating an exemplary embodiment of a synchronization signal and physical broadcast channel (SS/PBCH) block or synchronization signal block (SSB) of a communication system.

Referring to FIG. 5, an SS/PBCH block 500 of a communication system may be configured with a primary synchronization signal (PSS) transmitted in 127 subcarriers in the middle of a first OFDM symbol, a secondary synchronization signal (SSS) transmitted in 127 subcarriers in the middle of a third OFDM symbol, and a physical broadcast channel (PBCH) transmitted in second, third, and fourth OFDM symbols. The PBCH occupying the widest bandwidth may be transmitted over 20 RBs, which may be 3.6 MHz based on 15 kHz SCS. The base station transmits one SSB by applying the same beam. When the number of base station antennas increases or it is necessary to operate multiple beams such as applying one or more analog beams for high frequency support, the base station may support a multi-beam operation by transmitting multiple SSBs. Here, the term 'beam' may be expressed in various terms such as a transmission precoding or a spatial transmission (TX) filter when applied in practice. However, in order not to obscure the gist of the description, 'beam' is used hereinafter as a unified term.

For example, the base station may transmit a plurality of SSBs 530, 540, 550, and 560 to represent a plurality of beams (e.g., beam #1, beam #2, beam #3, beam #4). In this case, it may be possible that one or more SSBs are transmitted within one slot according to a pattern predetermined according to each numerology. The SSBs 530, 540, 550, and 560 to which different beams are applied may be bundled into one set by being included in an SS burst 520. The terminal may assume a half-frame window having a length of 5 ms at the time of monitoring SSBs. An SS burst set 515 configured by higher layer signaling within a half-frame may include one or more SS bursts 520. If RRC configuration values are unknown or unavailable when performing initial access (IA), the terminal may receive or measure the SSBs assuming that a periodicity of the SS burst set 510 is 20 ms. As an example, the terminal may receive SSB(s) with reference to SSB configuration information as follows.

```
MIB ::=                                  SEQUENCE {
  systemFrameNumber
  subCarrierSpacingCommon
  ssb-SubcarrierOffset         // SSB subcarrier offset (0~15)
  dmrs-TypeA-Position
  pdcch-ConfigSIB1
  cellBarred
  intraFreqReselection
  spare
}
MeasObjectNR ::=                         SEQUENCE {
  ssbFrequency                 // Absolute Radio Frequency Channel Number (ARFCN) of SSB
  ssbSubcarrierSpacing         // Numerology of SSB
  smtc1
     // first SSB measurement timing configuration (SMTC) configured with reference to SSB-MTC
  smtc2   // Second SMTC configured with reference to SSB-MTC
  ...
  ...
}
SSB-Index                      // SSB index within SS-burst
SSB-MTC ::=                                   SEQUENCE {
      // timing occasion configuration for SSBs to be measured by terminal
    periodicityAndOffset                           CHOICE {
    sf5          // offset when a SSB reception window has a legnth of 5 subframes
    sf10         // offset when a SSB reception window has a legnth of 10 subframes
    sf20         // offset when a SSB reception window has a legnth of 20 subframes
    sf40         // offset when a SSB reception window has a legnth of 40 subframes
    sf80         // offset when a SSB reception window has a legnth of 80 subframes
    sf160        // offset when a SSB reception window has a legnth of 160 subframes
  },
  duration       // a lengh of a SSB recepion window (number of subframes)
}
SSB-MTC2 ::=                             SEQUENCE {
  pci-List       // physical cell IDs (PCIs) following the SMTC configuration
  periodicity    // SMTC periodicity (number of subframes)
}
```

Figure 6:
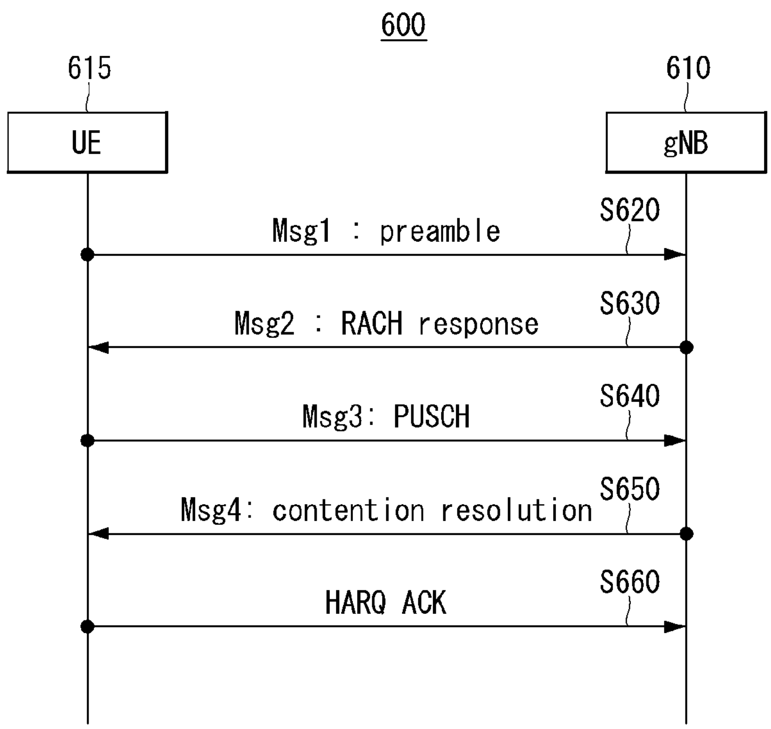
FIG. 6 is a sequence chart illustrating an exemplary embodiment of a random access procedure in a communication system.

FIG. 6 is a sequence chart illustrating an exemplary embodiment of a random access procedure in a communication system.

Referring to FIG. 6, in a random access procedure of a communication system 600, a terminal 615 may transmit a physical random access channel (PRACH) preamble, and the PRACH preamble may be referred to as 'Msg1' (S620). Through a transmission of the PRACH preamble, random access-radio network temporary identifier (RA-RNTI) may be determined. In this case, the RA-RNTI may be calculated by Equation 4.

RA-RNTI=1+s_id+14×t_id14×80×f_id+14×80×8×ul_carrier_ih [Equation 4]

In Equation 4, s_id may be an index of a first OFDM symbol of a corresponding PRACH occasion (e.g. 0≤s_id<14), t_id may be an index of a first slot of the PRACH occasion within a system frame (e.g., 0≤t_id<80), f_id may be an index of the PRACH occasion in the time domain (e.g., 0≤f_id<8), and ul_carrier_id may be a value according to a uplink carrier type used for the preamble transmission (e.g., 0 indicates a regular uplink carrier, 1 indicates a supplementary uplink carrier).

Before the terminal transmits the PRACH preamble, the terminal may have at least part of the following information by receiving system information from the base station on a PBCH or receiving RRC signaling from the base station.

PRACH preamble format
Time/frequency resource information for RACH transmission
Index for a logical root sequence table
Cyclic shift NCS
Set type (unrestricted, restricted set A, restricted set B)

Referring again to FIG. 6, as a second procedure, the base station may provide a random access response (RAR) to the terminal, which may be referred to as 'Msg2' (S630). Particularly, the base station may calculate an RA-RNTI based on Equation 4 when the base station receives the PRACH preamble from the terminal in the step S620, and may transmit a DCI by using the RA-RNTI for scrambling. The terminal may monitor a PDCCH scrambled with the RA-RNTI in a period included in a RACH response window configured by the higher layer in a type 1 PDCCH common search space (CSS). The terminal may receive the PDCCH (or the DCI transmitted from the base station through the PDCCH), and may decode the PDCCH (or the DCI). If the terminal successfully decodes the PDCCH (or the DCI), the terminal may decode a PDSCH including the RAR transmitted from the base station in the step S630. If the terminal succeeds in decoding the RAR, the terminal may identify whether an RA preamble identifier (RAPID) in the RAR matches a RAPID pre-allocated to the terminal.

As a third procedure, the terminal may transmit a PUSCH to the base station, which may be referred to as 'Msg3' (S640). To this end, the terminal may determine whether to apply a transform precoding to transmission of the PUSCH (i.e., whether to apply discrete Fourier transform (DFT)-s-OFDM-based transmission or OFDM-based transmission) based on a higher layer parameter (e.g., msg3-transform-Precoding). Also, the terminal may determine a SCS to be used for transmission of the PUSCH according to a higher layer parameter (e.g., msg3-scs). In this case, the PUSCH of Msg3 may be transmitted through a serving cell to which the PRACH has been transmitted.

As a fourth procedure, the base station may transmit a contention resolution message to the terminal, which may be referred to as 'Msg4' (S650). The terminal may start a timer for receiving the contention resolution message, and may monitor a PDCCH scrambled with a temporary cell-RNTI (TC-RNTI) in the type 1 PDCCH CSS until the timer expires. If the terminal successfully decodes the PDCCH, the terminal may decode a corresponding PDSCH including a MAC CE, and set the TC-RNTI as a cell-RNTI (C-RNTI). After successfully decoding the Msg4, the terminal may report a hybrid automatic repeat request (HARQ) positive-acknowledgement (ACK) thereto to the base station, and may report whether the RACH procedure is successful to the base station (S660).

The RACH occasion (RO) may mean a time and frequency resource specified for reception of a RACH preamble, and the terminal may use the RO for PRACH transmission. As described above, in the 5G NR, multiple SSBs may be associated with different beams for the multi-beam operation, and the terminal may measure the multiple SSBs, and select an optimal SSB (i.e., optimal beam) based on one of various schemes such as a reference signal received power (RSRP), reference signal received quality (RSRQ), signal-to-noise ratio (SNR), signal-to-noise/interference ratio (SNIR), or the like. Thereafter, the terminal may determine a beam (i.e., TX spatial filter) to be used for PRACH transmission based on the beam (i.e., RX spatial filter) used when receiving the optimal SSB. In this case, a relationship between SSB(s) and RO(s) may be established for the purpose of allowing the base station or the network to know which SSB (i.e., beam) the terminal has selected. Through such the relationship, the base station may know the SSB (i.e., beam) selected by the terminal based on the RO in which the terminal has transmitted the PRACH. For example, the relationship between SSB(s) and RO(s) may be determined with reference to the higher layer configurations as follows.

```
RACH-ConfigCommon ::=                              SEQUENCE {
  rach-ConfigGeneric                  // set of RACH parameters
  totalNumberOfRA-Preambles           // the total number of RACH preambles (1~63)
  ssb-perRACH-OccasionAndCB-PreamblesPerSSB   CHOICE {
    oneEighth      // The number of preambles per SSB when one SSB is associated with eight ROs
    oneFourth      // The number of preambles per SSB when one SSB is associated with four ROs
    oneHalf        // The number of preambles per SSB when one SSB is associated with two ROs
    one            // The number of preambles per SSB when one SSB is associated with one RO
    two            // The number of preambles per SSB when two SSBs are associated with one RO
    four           // The number of preambles per SSB when four SSBs are associated with one RO
    eight          // The number of preambles per SSB when eigth SSBs are associated with one RO
    sixteen        // The number of preambles per SSB when sixteen SSBs are associated with one RO
  }
  groupBconfigured                                  SEQUENCE {
    ra-Msg3SizeGroupA  // The size of a transport block fro contention-based RA of Group A
    messagePowerOffsetGroupB          // Threshold for preamble selection
    numberOfRA-PreamblesGroupA                 // The number of CB preambles per SSB of Group A
}
  ra-ContentionResolutionTimer     // Initial value of a contention resolution timer
```

-continued

```
  rsrp-ThresholdSSB       // Threshold for selection of an SSB and an associated RACH resource
  rsrp-ThresholdSSB-SUL   // Threshold for selection of an SSB and an associated RACH resource in
SUL
  prach-RootSequenceIndex                          CHOICE { // RACH root sequence index
    l839
    l139
  },
  msg1-SubcarrierSpacing       // SCS for Msg1 transmission
  restrictedSetConfig          // one of {unrestricted, restricted set A, restricted set B}
  msg3-transformPrecoder       // whether to apply transform precoding in transmisison of Msg3
  ...
}
RACH-ConfigGeneric ::=                 SEQUENCE {
  prach-ConfigurationIndex     // indicates a preamble format, etc.
  msg1-FDM                     // The number of ROs FDMed at a time
  msg1-FrequencyStart          // frequnency-axis offset of the lowest RO with reference to PRB 0
  zeroCorrelationZoneConfig    // N-CS configuration
  preambleReceivedTargetPower  // Target power level at a network receiving node
  preambleTransMax
      // The maximum number of RA preambe transmissions performed unitl declaration of an RA
failure
  powerRampingStep             // Power ramping step
  ra-ResponseWindow            // Msg2 (RAR) window length (number of slots)
  ...,
}
```

Figure 7:
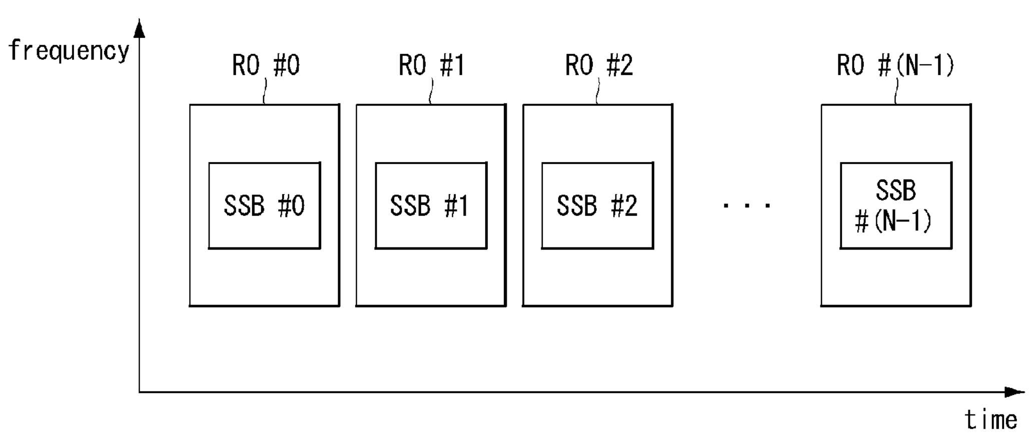
FIG. 7 is a conceptual diagram illustrating a first exemplary embodiment of SSB-RO association according to RACH configuration in a communication system.

FIG. 7 is a conceptual diagram illustrating a first exemplary embodiment of SSB-RO association according to RACH configuration in a communication system.

Referring to FIG. 7, in an SSB-RO mapping relation according to the RACH configurations, in a certain frequency band, N SSBs 710-1 to **710-*n* having time resources which are separated from each other may be mapped to ROs 720-1 to 720-*n* having time resources which are separated from each other on a one-to-one basis. For example, if a higher layer parameter msg1-FDM is set to 1 (i.e., msg1-FDM=one) and a higher layer parameter ssb-perRACH-OccasionAndCB-PreamblesPerSSB is set to 1 (e.g., ssb-perRACH-OccasionAndCB-PreamblesPerSSB=one), the N different SSBs 710-1 to 710-*n* may be mapped to the N different ROs 720-1 to 720-*n*** on a one-to-one basis.

Figure 8:
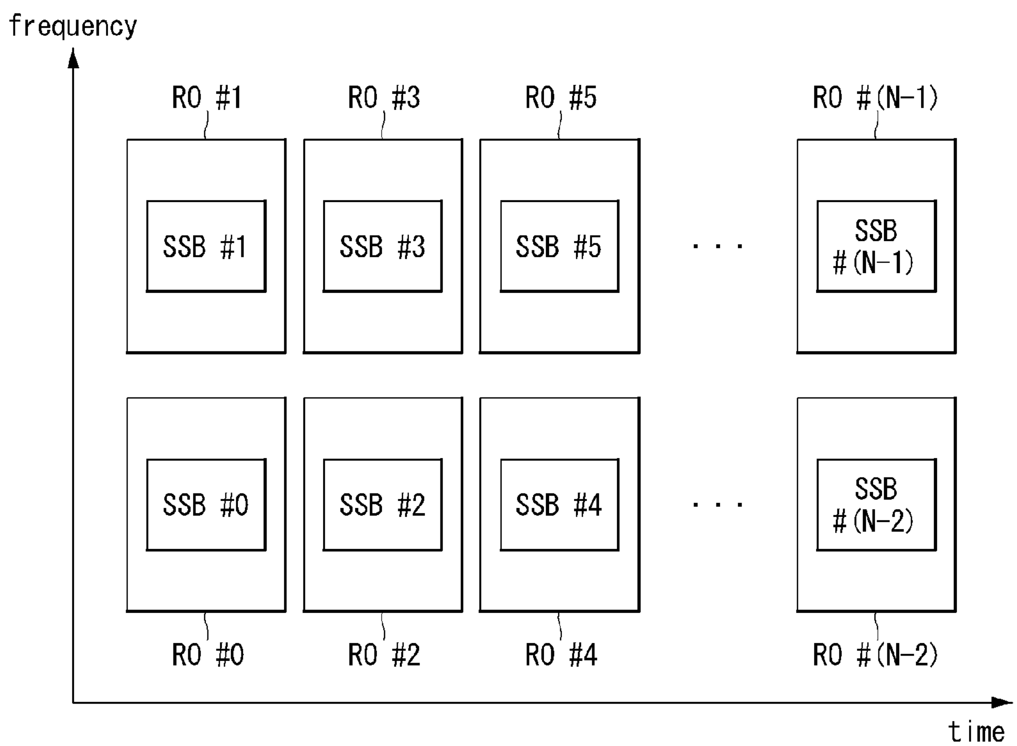
FIG. 8 is a conceptual diagram illustrating a second exemplary embodiment of SSB-RO association according to RACH configuration in a communication system.

FIG. 8 is a conceptual diagram illustrating a second exemplary embodiment of SSB-RO association according to RACH configuration in a communication system.

Referring to FIG. 8, in an SSB-RO association according to RACH configuration, SSBs 810-1, 810-3, 810-5, . . . , and **810-(*n*-1)) different in time in a first frequency band may be associated in one-to-one scheme with ROs 820-1, 820-3, 820-5, . . . , and 810-(*n*-1)) different in time in the first frequency band, and SSBs 810-2, 810-4, 810-6, . . . , and 810-*n* different in time in a second frequency band may be associated in one-to-one scheme with ROs 820-2, 820-4, 820-6, . . . , and 810-*n* different in time in the second frequency band. In this case, a frequency division higher layer parameter (e.g., msg1-FDM) may be set to 2 (e.g., msg1-FDM=two), and a time division higher layer parameter (e.g., ssb-perRACH-OccasionAndCB-Preambles-PerSSB) may be set to 2 (e.g., ssb-perRACH-OccasionAndCB-PreamblesPerSSB=two). As such, the N different SSBs 810-1 to 810-*n* may be associated with N different ROs 820-1 to 820-*n*** by occupying two bandwidths.

Meanwhile, the 5G NR communication system may support DCI formats shown in Table 4 based on Release-16.

TABLE 4

| DCI format | Usage |
|---|---|
| 0_0 | Used for scheduling a PUSCH within one cell |
| 0_1 | Used for scheduling one or more PUSCHs within one cell, or indicating downlink feedback information for a configured grant (CG) PUSCH (i.e., CG-DFI) |
| 0_2 | Used for scheduling a PUSCH within one cell |
| 1_0 | Used for scheduling a PDSCH within one cell |
| 1_1 | Used for scheduling a PDSCH within one cell or triggering a one-shot HARQ-ACK codebook feedback |
| 1_2 | Used for scheduling a PDSCH within one cell |
| 2_0 | Used for notifying a slot format, an available RB set, a channel occupancy time (COT) duration, and search space set group switching to a UE group |
| 2_1 | Used for notifying PRB(s) and OFDM symbol(s) assumed not to be intended to be used for transmission to a UE group |
| 2_2 | Used for transmission of a transmission power control (TPC) for a PUCCH and a PUSCH |
| 2_3 | Used for transmission of a TPC command group for SRS transmission by one or more UEs |
| 2_4 | Used for a UE to notify PRB(s) and OFDM symbol(s) for which UL transmission from the UE is cancelled to a UE group |
| 2_5 | Used for notifying availability of soft resources |
| 2_6 | Used for notifying power saving information outside a DRX active time to one or more UEs |
| 3_0 | Used for NR sidelink scheduling within one cell |
| 3_1 | Used for LTE sidelink scheduling within one cell |

A DCI may include downlink control information for one or more cells, and may be associated with one RNTI. The DCI may be encoded through the order of 1) information element multiplexing, 2) cyclic redundancy check (CRC) addition, 3) channel coding, and 4) rate matching, and decoding may also be performed in consideration of the above steps. In the above description, "a certain DCI is associated with one RNTI" may mean that CRC parity bits of the DCI are scrambled with the RNTI. Referring to Table 6, some DCI may include scheduling information of one or more PUSCHs for a certain cell.

For example, a CRC of the DCI format 0_1 may be scrambled with a C-RNTI, configured scheduling-RNTI (CS-RNTI), semi-persistent CSI RNTI (SP-CSI-RNTI), or modulation coding scheme cell RNTI (MCS-C-RNTI). The DCI format 0_1 may include at least one of the following information.

- Identifier for DCI format (1 bit): Indicator indicating a UL DCI format, which is always set to 0 in the case of DCI format 0_1
- Carrier indicator (0 or 3 bits): Indicator indicating a CC scheduled by the corresponding DCI
- DFI flag (0 or 1 bit): Configured grant downlink feedback information (CG-DFI) indicator.
- If the DCI format 0_1 is used for CG-DFI indication (when the DFI flag is set to 1), at least one of the following fields may be used:
- HARQ-ACK bitmap (16 bits), where the order of mapping HARQ process indexes within the bitmap is that the HARQ process indexes are mapped from the MSB to the LSB of the bitmap in ascending order. For each bit in the bitmap, a value of 1 indicates ACK, and a value of 0 indicates NACK.
- TPC command for a scheduled PUSCH (2 bits)
- All the remaining bits in the DCI format 0_1 are set to zero
- If the DCI format 0_1 is not used for CG-DFI indication (when there is no DFI flag field or DFI flag field is set to 0), at least one of the following fields may be used:
- UL/SUL indicator (0 or 1 bit): supplementary UL indicator.
- Bandwidth part indicator (0, 1, or 2 bits): Indicator indicating a BWP to be activated among uplink BWPs configured for the terminal.
- Frequency domain resource assignment: Indicator for allocating a frequency domain resource.
- Time domain resource assignment: Indicator for allocating a time domain resource.
- Frequency hopping flag (0 or 1 bit): Frequency axis hopping indicator
- Modulation and coding scheme (5 bits)
- New data indicator (NDI): Indicator indicating whether allocated data is new data or retransmission data.
- Redundancy version (RV): Indicator indicating an RV value when channel coding is applied to allocated data
- HARQ process number (4 bits): Indicator indicating a HARQ process to be allocated to scheduled data
- TPC command for a scheduled PUSCH (2 bits): TPC indicator
- SRS resource indicator: Aperiodic SRS resource selection indicator
- Precoding information and number of layers: Indicator indicating precoding and the number of transport layers to be used in PUSCH transmission
- Antenna ports: Indicator for uplink antenna ports to be used for PUSCH transmission
- SRS request: Indicator indicating whether to transmit aperiodic SRS
- CSI request: Indicator indicating whether and how to report channel state information
- PTRS-DMRS association: Indicator indicating a relationship between an uplink phase-noise tracking reference signal (PTRS) antenna port and a demodulation reference signal (DMRS) antenna port
- DMRS sequence initialization: Indicator for a DMRS sequence initialization value during OFDM-based uplink transmission
- UL-SCH indicator: Indicator indicating whether or not an uplink shared channel (UL-SCH) is included in a PUSCH (a PUSCH that does not include a UL-SCH needs to include CSI)
- Open-loop power control parameter set indication: Indicator indicating a set of open-loop power control (OPLC) parameter set
- Priority indicator: Uplink transmission priority indicator.
- Invalid symbol pattern indicator: Indicator indicating whether to apply an invalid symbol pattern configured by a higher layer As another example, a CRC of the DCI format 1_1 may be scrambled with a C-RNTI, CS-RNTI, or MCS-C-RNTI, and the DCI format 1_1 may include at least one of the following information.

- Identifier for DCI format (1 bit): Indicator indicating a DL DCI format, which is always set to 1 in the case of DCI format 1_1
- Carrier indicator (0 or 3 bits): Indicator indicating a CC scheduled by the corresponding DCI
- Bandwidth part indicator (0, 1, or 2 bits): Indicator indicating a BWP to be activated among downlink BWPs configured for the terminal
- Frequency domain resource assignment: Indicator for allocating a frequency domain resource
- Time domain resource assignment: Indicator for allocating a time domain resource
- PRB bundling size indicator: Indicator indicating a type (i.e., static or dynamic) and a size of PRB bundling
- Rate matching indicator: Indicator indicating a rate matching pattern configured by a higher layer
- ZP CSI-RS trigger: Indicator for applying aperiodic zero-power (ZP) CSI-RS
- 'modulation and coding scheme', 'new data indicator', and 'redundancy version' fields for a transport block 1
- 'modulation and coding scheme', 'new data indicator', and 'redundancy version' fields for a transport block 2
- HARQ process number: Indicator indicating a HARQ process to be allocated to scheduled data
- Downlink assignment index: DAI indicator for HARQ-ACK codebook generation in TDD operation.
- TPC command for a scheduled PUCCH: Power control indicator for PUCCH transmission.
- PUCCH resource indicator: Indicator indicating a PUCCH resource for transmitting HARQ-ACK information for an allocated PDSCH or a predetermined PDSCH set
- PDSCH-to-HARQ_feedback timing indicator: Indicator indicating a time axis offset between the allocated PDSCH and the PUCCH
- Antenna port(s): Indicator indicating antenna ports to be used for PDSCH transmission/reception
- Transmission configuration indication: Indicator indicating transmission configuration information (TCI) to be used for PDSCH transmission and reception
- SRS request: Indicator indicating whether to transmit aperiodic SRS
- DMRS sequence initialization: Indicator for a DMRS sequence initialization value used for PDSCH transmission and reception
- Priority indicator: PDSCH reception priority indicator As another example, certain DCI formats may be used to deliver the same control information to one or more terminals. For example, a CRC of the DCI format 2_3 may be scrambled with a transmit power control-sounding reference signal-RNTI (TPC-SRS-RNTI), and may include at least one of the following information.

- Block number 1, Block number 2, . . . , Block number B: Indicators indicating resource regions to which the DCI format 2_3 is applied. A starting part of the block is configured by a higher layer parameter startingBitOfFormat2-3 or startingBitOfFormat2-3SUL-v1530.
- When a terminal for which a higher layer parameter srs-TPC-PDCCH-Group is set to type A performs uplink transmission without a PUCCH and PUSCH or uplink transmission in which SRS power control is not tied to PUSCH power control, one block is configured by the higher layer, and the following fields are defined for the block.

SRS request (0 or 2 bits): Aperiodic SRS transmission indicator

TPC command number 1, TPC command number 2, . . . , TPC command number N: Indicators indicating uplink power control to be applied to a UL carrier indicated by a higher layer parameter cc-IndexInOneCC-Set.

When a terminal for which a higher layer parameter srs-TPC-PDCCH-Group is set to type B performs uplink transmission without a PUCCH and PUSCH or uplink transmission in which SRS power control is not tied to PUSCH power control, one or more blocks may be configured by the higher layer, and the following fields are defined for each block.

SRS request (0 or 2 bits): Aperiodic SRS transmission indicator.

TPC command (2 bits)

As another example, certain DCI formats may be used to deliver the same control information to one or more terminals. For example, a CRC of the DCI format 2_0 may be scrambled with an SFI-RNTI, and may be used for notifying information such as a slot format, a channel occupancy time (COT) duration, an available RB set, a search space set group switching, or the like. Specifically, the DCI format 2_0 may include at least one of the following information.

When a higher layer parameter slotFormatCombToAddModList is configured,

Slot format indicator 1, Slot format indicator 2, . . . , Slot format indicator N When a higher layer parameter availableRB-SetsToAddModList-r16 is configured, Available RB set indicator 1, Available RB set indicator 2, . . . , Available RB set indicator N1

When a higher layer parameter co-DurationsPerCellToAddModList-r16 is configured, COT duration indicator 1, COT duration indicator 2, . . . , COT duration indicator N2

When a higher layer parameter searchSpaceSwitchTriggerToAddModList-r16 is configured, Search space set group switching flag 1, Search space set group switching flag 2, . . . , Search space set group switching flag M The size of the DCI format 2_0 may be set by higher layer signaling as one of 0 to 128 bits. For example, the DCI format 2_5 may be used to notify availability of soft-type resources of an IAB node. A CRC of the DCI format 2_5 may be scrambled with an availability indicator-RNTI (AI-RNTI), and may include the following information.

Availability indicator 1, Availability indicator 2, . . . , and Availability indicator N As the size of DCI format 2_5, one of values less than or equal to 128 bits may be set by higher layer signaling. The terminal may receive configuration information of a CORESET #0 and a search space #0 as follows.

```
PDCCH-ConfigSIB1 ::=                                   SEQUENCE {
   controlResourceSetZero
   searchSpaceZero
}
ControlResourceSetZero    // indicates a configuration value (0~15) of a CORESET #0 within an initial
BWP
SearchSpaceZero           // indicates a configuration value (0~15) of a search space #0 within an initial
BWP
```

The terminal may refer to the following higher layer configurations for cell-specific PDCCH monitoring as follows.

```
PDCCH-ConfigCommon ::=                                  SEQUENCE {
   controlResourceSetZero // indicates a configuration value (0~15) of a CORESET #0 within an
initial BWP
   commonControlResourceSet
         // configure a common CORESET by referring to CORESET configuration
searchSpaceZero   // indicates a configuration value (0~15) of a search space #0 within an initial
BWP
   commonSearchSpaceList                 // configures a search sapce to be used for cell-specific PDCCH
monitoring by referring to up to four search space configurations
   searchSpaceSIB1                       // search space configuration for SIB1
   searchSpaceOtherSystemInformation                    // search space configuration for SIB2 or other SIBs
   pagingSearchSpace                                    // search space configuration for paging
   ra-SearchSpace                                       // search space configuration for random access
procedure
   ...
}
ControlResourceSet ::=                          SEQUENCE {
   controlResourceSetId                        // CORESET ID (a value other than 0 is used)
   frequencyDomainResources                    // configuration of frequency resources of a CORESET
   duration                                         // configuration of a time-axis length (symbols) of a
CORESET
   cce-REG-MappingType                                   CHOICE { // CCE-to-REG mapping
configuration
      interleaved                                        SEQUENCE {
         reg-BundleSize
         interleaverSize
```

-continued

```
        shiftIndex
      },
      nonInterleaved
    },
    precoderGranularity
    tci-StatesPDCCH-ToAddList
                                        // indicates a QCL relation possible between a QCL reference RS and a PDCCH
DMRS
    tci-StatesPDCCH-ToReleaseList
    tci-PresentInDCI                    // indicates whether a TCI field exists within the DCI format 1_1
    pdcch-DMRS-ScramblingID             // indicates a scrambling initialization value of a PDCCH DMRS
    ...
}
SearchSpace ::=                                         SEQUENCE {
    searchSpaceId                       // search space ID
    controlResourceSetId                // CORESET ID associated with the search space
monitoringSlotPeriodicityAndOffset                      CHOICE { // periodicity and offset of a PDCCH
monitoring slot
      sl1                               // performs PDCCH monitoring in every slot
      ...
                                        // (omitted) monitoring offset values when a PDCCH monitoring periodicity
is one of 2 to 1280 slots
      sl2560                            // a monitoring offset value when a PDCCH monitoring periodicity is 2560 slots
    }
    duration                            // the number of slots where a search space exists for each occasion
수
    monitoringSymbolsWithinSlot
     // a position of a first symbol on which monitoring is to be performed within a PDCCH
monitoring slot
    nrofCandidates                                      SEQUENCE {
      aggregationLevel1                 // The number of PDCCH candidates in case of aggregation level 1
      aggregationLevel2                 // The number of PDCCH candidates in case of aggregation level 2
      aggregationLevel4                 // The number of PDCCH candidates in case of aggregation level 4
      aggregationLevel8                 // The number of PDCCH candidates in case of aggregation level 8
      aggregationLevel16                // The number of PDCCH candidates in case of aggregation level 16
    }
    searchSpaceType                                     CHOICE { // indicates a search space type
(common or UE-specific) and DCI formats
      common                                            SEQUENCE {
        dci-Format0-0-AndFormat1-0                      SEQUENCE {
          ...
        }
        dci-Format2-0                                   SEQUENCE {
          nrofCandidates-SFI                            SEQUENCE {
            ...
          },
          ...
        }
        dci-Format2-1
        dci-Format2-2
        dci-Format2-3                                   SEQUENCE {
          dummy 1
          dummy 2
        }
      },
      ue-Specific                                       SEQUENCE {
        dci-Formats
        ...,
      }
    }
}
```

The terminal may refer to the following higher layer configurations for UE-specific PDCCH monitoring as follows.

```
PDCCH-Config ::=                                SEQUENCE {
    controlResourceSetToAddModList
      // At most three CORESETs are configured by referring to CORESET configuration
    controlResourceSetToReleaseList
    searchSpacesToAddModList
      // At most ten search spaces are configured by referring to search space configuration
searchSpacesToReleaseList
    downlinkPreemption                  // downlink preemption indicator
    tpc-PUSCH                           // configuraion of reception of a group TPC for PUSCH transmission
```

-continued

```
  tpc-PUCCH                       // configuration of reception of a group TPC for PUCCH
transmission
  tpc-SRS                       // configuration of reception of a group TPC for SRS transmission
  ...,
}
```

The presence of one antenna port may mean a case in which a channel experienced by a symbol transmitted through the corresponding antenna port can be estimated or inferred from a channel experienced by another symbol transmitted through the same antenna port.

"Two different antenna ports are quasi co-located (QCLed)" may mean a case in which large-scale characteristics of a channel experienced by a symbol transmitted through one antenna port can be estimated or inferred from a channel experienced by a symbol transmitted through another antenna port. The large-scale characteristics of the channel may mean at least one of 'delay spread', 'Doppler spread', 'Doppler shift', 'average gain', 'average delay', and 'spatial Rx parameters'.

When time/frequency resources of a certain signal (e.g., QCL target RS) are insufficient and large-scale characteristics of a channel cannot be accurately measured with only the corresponding signal, information (i.e., QCL information) on another signal (e.g., QCL reference RS having sufficient time/frequency resources) having large-scale characteristics that can be reused for reception of the corresponding signal (i.e., QCL target RS) may be provided to the terminal to improve the channel measurement performance of the terminal. The NR communication system may support various QCL types as follows.

QCL-Type A: including {Doppler shift, Doppler spread, average delay, delay spread}.

QCL-Type B: including {Doppler shift, Doppler spread}

QCL-Type C: including {Doppler shift, average delay}

QCL-Type D: including {Spatial Rx parameters}

Figure 9:
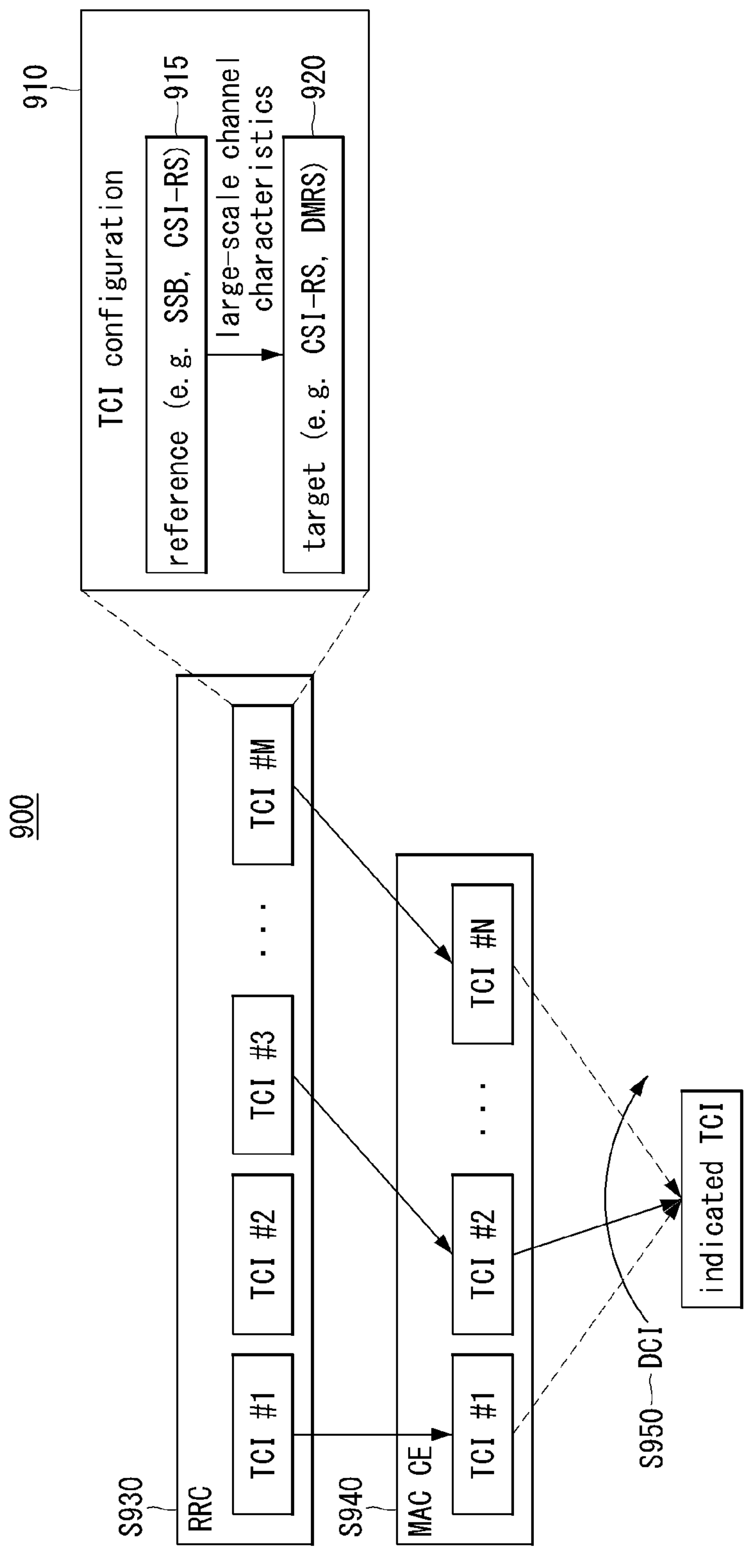
FIG. 9 is a conceptual diagram illustrating an exemplary embodiment of a QCL information transfer process through TCI state configuration and indication in a communication system.

FIG. 9 is a conceptual diagram illustrating an exemplary embodiment of a QCL information transfer process through TCI state configuration and indication in a communication system.

Referring to FIG. 9, in a process of transmitting QCL information through TCI state configuration and indication in a communication system 900, a base station may configure at most M TCI states to a terminal through higher layer (i.e., RRC) signaling, in accordance with a UE capability report and a maximum value (e.g., 4, 8, 64, or 128 depending on a frequency band) defined in a technical specification (S930). In this case, each TCI state configuration 910 may include information on a signal or channel (i.e., QCL reference 915) that provides large-scale channel characteristics to a signal or channel (i.e., QCL target 920) referring to the TCI. One TCI state configuration 910 may include up to two references (i.e., qcl-Type1 and qcl-Type2), the first reference may be one of the QCL-Type A, QCL-Type B, and QCL-type C (i.e., qcl-type1∈{QCL-type A, QCL-type B. QCL-type C}), and the second reference may be the QCL-type D if present (i.e., qcl-type 2=QCL-type D).

Allowing the base station to apply all the TCIs configured through the RRC signaling in real time may greatly increase implementation complexity of the terminal, the base station may transmit an activation message for some of the TCIs configured through the RRC signaling to the terminal through L2 signaling such as a MAC CE (S940). The base station may activate a maximum of N (<M) TCIs, and the terminal may receive a dynamic indication only for the activated TCI.

Thereafter, the base station may dynamically indicate to the terminal some of the activated N TCIs through L1 signaling such as a DCI (S950). The terminal may apply QCL information indicated by the corresponding TCI at a predetermined timing after receiving the L1 signaling, and may perform a reception operation for the signal or channel.

The TCI state indication steps including the 'RRC signaling (S930)', 'MAC CE signaling (S940)', and 'DCI signaling (S950)' of FIG. 9 may be partially omitted depending on a type of the QCL target RS. For example, when the QCL target is a PDSCH DMRS, and one or more TCI states are configured through RRC signaling, the base station may indicate the TCI state using all the steps of FIG. 9. However, when the QCL target is a PDSCH DMRS, and a single TCI state is configured through RRC signaling, the MAC CE signaling (S940) and the DCI signaling step (S950) may be omitted. Similarly, when the QCL target is a PDCCH DMRS, the DCI signaling step S940 may be omitted. Specifically, the terminal may obtain configuration information for the TCI states and QCL information with reference to the RRC signaling as follows.

```
TCI-State ::=            SEQUENCE { // TCI configuration (L1-00)
  tci-StateId          // TCI state ID
  qcl-Type1            // first QCL reference configured by referring to QCL information
  qcl-Type2            // second QCL reference configured by referring to QCL information
  ...
}
QCL-Info ::=             SEQUENCE {
  cell                 // index of a cell in which QCL reference is transmitted
  bwp-Id               // index of a BWP in which QCL reference is transmitted
  referenceSignal          CHOICE {
    csi-rs             // index of a CSI-RS to be referred when QCL reference is a CSI-RS
    ssb                // index of an SSB to be referred when QCL reference is an SSB
  },
  qcl-Type
   // QCL type to be applied to a QCL target (one of QCL-type A, QCL-type B, QCL-type C, and
QCL-type D)
  ...
}
```

The base station may instruct the terminal to activate or deactivate some of the TCI states configured by the RRC signaling through MAC CE signaling, or may instruct the terminal to apply a TCI state indicated by a MAC CE to the QCL target RS. For example, the base station may use the following MAC CE signaling according to the type of the QCL target RS.

- TCI state activation/deactivation MAC CE for a UE-specific PDSCH DMRS
- TCI state indication MAC CE for a UE-specific PDCCH DMRS
- TCI state activation/deactivation MAC CE for an enhanced UE-specific PDSCH DMRS FIG. 10 is a conceptual diagram illustrating an exemplary embodiment of a TCI state activation/deactivation MAC CE in a communication system.

Referring to FIG. 10, a first octet (Oct 1) in a TCI state activation/deactivation MAC CE for a UE-specific PDSCH DMRS may include a COREST pool ID field 1010, a serving cell ID field 1020, and a BWP ID field 1030, and a second octet (Oct 2) to an N-th octet (Oct N) may include Ti fields 1040 indicating TCI state IDs i. The detailed meaning of each field may be as follows, and the sizes thereof may be variable.

- Serving cell ID: a serving cell ID to which the MAC CE is applied
- BWP ID: BWP ID to which the MAC CE is applied, which indicates a BWP in association with a BWP indication field within the DCI
- Ti: indicates a TCI state ID i. When this value is set to 0, it may mean that a TCI state whose TCI state ID is i is deactivated, and when this value is set to 1, it may mean that a TCI state whose TCI state ID is i is activated. The TCI states activated by 1 may be sequentially mapped to TCI indication field code points within the DCI.
- CORESET pool ID: If a DCI scheduling a PDSCH is monitored in a CORESET that does not include a higher layer parameter coresetPoolIndex, the field may be ignored. If a DCI scheduling a PDSCH is monitored in a CORESET including the higher layer parameter coresetPoolIndex, Ti indication may be applied only when a value of the CORESET pool ID matches a value of coresetPoolIndex of the CORESET.

Figure 11:
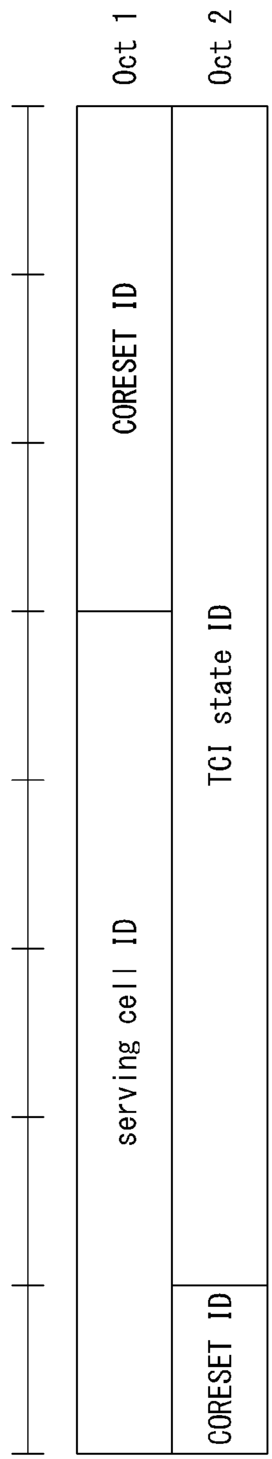
FIG. 11 is a conceptual diagram illustrating an exemplary embodiment of a TCI state indication MAC CE in a communication system.

FIG. 11 is a conceptual diagram illustrating an exemplary embodiment of a TCI state indication MAC CE in a communication system.

Referring to FIG. 11, a first octet (Oct 1) in a TCI state activation/deactivation MAC CE for a UE-specific PDSCH DMRS may include a serving cell ID field 1110 and a CORESET ID field 1120, and a second octet (Oct 2) may include a CORESET ID field 1130 and a TCI state ID field 1140. The sizes thereof may be variable.

- Serving cell ID: a serving cell ID to which the corresponding MAC CE is applied.
- CORESET ID: indicates a CORESET to which the MAC CE is applied. If this value is set to 0, a CORESET configured through controlResourceSetZero may be a CORESET #0.
- TCI state ID: means a TCI state ID indicated by the corresponding MAC CE. The base station may configure spatial relation information to the terminal through higher layer (e.g., RRC) signaling in order to indicate uplink beam information. The spatial relation information may mean a signaling structure for using spatial domain filters used for transmission and reception of a reference RS for spatial TX filters for uplink transmission of a target RS according to the corresponding spatial relation. The spatial reference RS may be a downlink signal such as SSB or CSI-RS, and may also be an uplink signal such as SRS. If the reference RS is a downlink signal, the terminal may use the spatial RX filter values used for receiving the reference RS as spatial TX filter values for transmitting the target RS according to the spatial relation. If the reference RS is an uplink signal, the terminal may use the spatial TX filter values used for transmitting the reference RS as the spatial TX filter values for transmitting the target RS according to the spatial relation.

The signaling structure for the spatial relation information may vary depending on the type of target RS. For example, when the target RS is an SRS, the base station may perform RRC configuration for each SRS resource based on a message as follows.

```
SRS-SpatialRelationInfo ::=     SEQUENCE {
  servingCellId                  // index of a serving cell in which a reference RS is transmitted
  referenceSignal                  CHOICE {
    ssb-Index                  // SSB index when a reference RS is SSB
    csi-RS-Index               // CSI-RS resource index when a reference RS is CSI-RS
    srs                              SEQUENCE {
      resourceId                  // SRS resource index when a reference RS is SRS
      uplinkBWP                   // index of a UL BWP in which SRS is transmitted when a reference
RS is SRS
    }
  }
}
```

For example, when the target RS is an SRS, the base station may perform RRC configuration for each SRS resource as follows.

```
PUCCH-SpatialRelationInfo ::=        SEQUENCE {
  pucch-SpatialRelationInfoId     // spatial relation information ID for PUCCH
  servingCellId                   // index of a serving cell in which a reference RS is
transmitted
  referenceSignal                       CHOICE {
    ssb-Index                     // SSB index when a reference RS is SSB
    csi-RS-Index                  // CSI-RS resource index when a reference RS is CSI-RS
```

-continued

```
    srs                        // specifiy a SRS resource by referring to PUCCH-SRS
configuration
},
  pucch-PathlossReferenceRS-Id
      // index of a RS resource to be used for measurement of a pathloss of a PUCCH
  p0-PUCCH-Id  // index of confuring p0 for PUCCH power control
  closedLoopIndex  // configuration value of closed-loop power control
}
PUCCH-SRS ::= SEQUENCE {
  resource                     // SRS resource index
  uplinkBWP                    // index of a BWP in which SRS is transmitted
}
```

Meanwhile, in general, it may not be possible to force all terminals to implement the same feature. The UE capability report may enable an expensive terminal to implement a large amount of features with high performance, and may enable a low-cost terminal to implement a small amount of features with low performance. The UE capability report may make it possible to secure the degree of freedom in terminal implementation for various situations, and when the capability information is reported to the network, the base station may configure each function within the limits supported by each terminal. Certain functions may be promised to be mandatory for all terminals to implement, and in this case, it may be possible to omit the UE capability report for the mandatory functions.

It may be possible for the terminal to perform UE capability reporting of different values for one function for each frequency band or for each duplex scheme. For example, the terminal may support a specific function for a frequency range 1 (FR1), which means a band below 6 GHz, but may report to the base station that the terminal does not support a specific function for a frequency range 2 (FR2), which means a band above 6 GHz. As another example, the terminal may report to the base station that a specific function is supported in the TDD scheme but not supported in the FDD scheme.

When the terminal performs the UE capability reporting, the base station should follow (should not violate) the content of the UE capability report when perform configuration, indication, or scheduling on the terminal. If the base station indicates, to the terminal, configuration, indication or scheduling contrary to the UE capability report, the terminal may ignore it.

In the 5G NR communication system, a slot format may include downlink symbol(s), uplink symbol(s), and/or flexible symbol(s).

Figure 12:
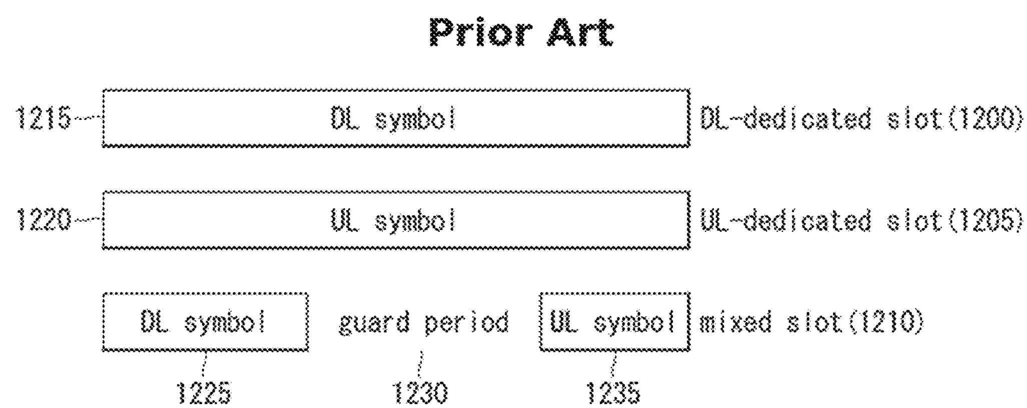
FIG. 12 is a conceptual diagram illustrating slot configurations according to slot formats in a communication system.

FIG. 12 is a conceptual diagram illustrating slot configurations according to slot formats in a communication system.

Referring to FIG. 12, in slot configurations according to slot formats in a communication system, a downlink dedicated slot 1200 may be a slot in which all symbols within the slot are configured only as downlink symbols 1215 according to a slot format. As another example, an uplink dedicated slot 1205 may be a slot in which all symbols within the slot are configured only as uplink symbols 1220 according to a slot format. As another example, in a downlink/uplink mixed slot 1210, some symbols within the slot may be configured as downlink symbols 1225, and some symbols within the slot may be configured as uplink symbols 1235 according to a slot format. In this case, specific symbols of the mixed slot 1210 including both the uplink and downlink symbols may be configured or indicated as a guard period 1230 for downlink-uplink switching, and the terminal may not perform transmission/reception during the guard period 1230.

In the 5G NR communication system, the base station may configure a 'slot format' over one or more slots for each serving cell to the terminal through a higher layer parameter tdd-UL-DL-ConfigurationCommon. In this case, the higher layer parameter tdd-UL-DL-ConfigurationCommon may include or refer to at least one of the following information.

Reference subcarrier spacing: reference numerology $\mu_{ref}$

Pattern 1: A first pattern.

Pattern 2: A second pattern.

Here, the pattern 1 or pattern 2 may include at least one of the following configurations.

Slot configuration periodicity (i.e., dl-UL-Transmission-Periodicity): Slot configuration periodicity P expressed in units of msec Number of downlink dedicated slots (i.e., nrofDownlinkSlots): The number $d_{slots}$ of slots composed only of downlink symbols Number of downlink symbols (i.e., nrofDownlinkSymbols): The number $d_{sym}$ of downlink symbols Number of uplink dedicated slots (i.e., nrofUplinkSlots): The number $\mu_{slots}$ of slots composed only of uplink symbols Number of uplink symbols (i.e., nrofUplinkSymbols): The number $\mu_{sym}$ of uplink symbols The slot configuration periodicity P msec of the first pattern may include $S=P\cdot 2^{\mu_{ref}}$ slots, and in this case, the numerology may follow $\mu_{ref}$. In addition, among the S slots, the first dslots slots may include only downlink symbols, and the last Uslots slots may include only uplink symbols. In this case, $d_{sym}$ ofsymbols after first dslots slots may be downlink symbols. In addition, $\mu_{sym}$ of symbols before last Uslots slots may be uplink symbols. The remaining symbols $$\left(\text{i.e., } (S - d_{slots} - u_{slots}) \cdot N_{symb}^{slot} - d_{sym} - u_{sym} \text{ symbols}\right)$$

that are not designated as downlink symbols or uplink symbols in the pattern may be flexible symbols.

If the second pattern is configured and the slot configuration periodicity of the second pattern is $P_2$, a slot configuration periodicity $P+P_2$ msec configured with a combination of the first pattern and the second pattern may include first $S=P_2\cdot 2^{\mu_{ref}}$ slots and second $S_2=P_2\cdot 2^{\mu_{ref}}$ slots. In this case, the positions and numbers of downlink symbols, uplink symbols, and flexible symbols in the second pattern may be configured with reference to the description of the first pattern based on configuration information of the second pattern. In addition, when the second pattern is configured, the terminal may assume that $P+P_2$ is a divisor of 20 msec.

The base station may override direction(s) of 'flexible symbol(s)' among symbols configured through the higher layer parameter (e.g., tdd-UL-DL-ConfigurationCommon) by using the higher layer parameter (e.g., tdd-UL-DL-ConfigurationDedicated) based on the following information.

- Slot configuration set (i.e., slotSpecificConfigurationsToAddModList): A set of slot configurations
- Slot index (i.e., slotindex): An index of a slot included in the set of slot configurations
- Symbol directions (i.e., symbols): The directions of the symbols indicated by the slot index (i.e., slotindex). If all symbol directions are downlink (symbols=allDownlink), all symbols within the corresponding slot are downlink symbols. If all symbol directions are uplink (symbols=allUplink), all symbols within the corresponding slot are uplink symbols. If the symbol directions are explicit (symbols=explicit), nrofDownlinkSymbols may indicate the number of downlink symbols located in the first part of the corresponding slot, and nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

In the 5G communication system, the base station may indicate a slot format to the terminal based on L1 signaling. For example, when the terminal receives a higher layer parameter SlotFormatIndicator from the base station, the terminal may obtain configuration information a slot format indication-RNTI (i.e., SFI-RNTI). Meanwhile, when the terminal receives a higher layer parameter dci-PayloadSize from the base station, the terminal may obtain configuration information of a payload size of the DCI format 2_0. In addition, the terminal may additionally receive, from the base station, information on PDCCH candidate(s), CCE aggregation level, and search space set(s) of a CORESET for monitoring the DCI format 2_0. Each slot format indication (SFI) index field in the DCI format 2_0 may indicate a slot format to be applied to each slot in a slot set of a DL BWP and a UL BWP from a slot in which the terminal has detected the corresponding DCI format 2_0. In this case, the size of the slot set may be equal to or greater than a PDCCH monitoring periodicity of the DCI 10 format 2_0. For example, when the slot set is composed of N slots, the DCI format 2_0 may include N SFI index fields, and each SFI index field may indicate a format value of Table 5 below. In Table 5, 'D' may mean a downlink symbol, 'U' may mean an uplink symbol, and 'F' may mean a flexible symbol.

TABLE 5

| Slot for- | Symbol number within a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |

TABLE 5-continued

| Slot for- | Symbol number within a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines a slot format of a slot based on a higher layer parameter tdd-UL-DL-ConfigurationCommon or a higher layer parameter tdd-UL-DL-ConfigurationDedicated, and a detected DCI format (when exists). | | | | | | | | | | | | | |

In the 5G NR communication system, it may be possible to support flexible and dense wireless backhaul links for each cell through the IAB feature, without support of a wired network.

Figure 13:
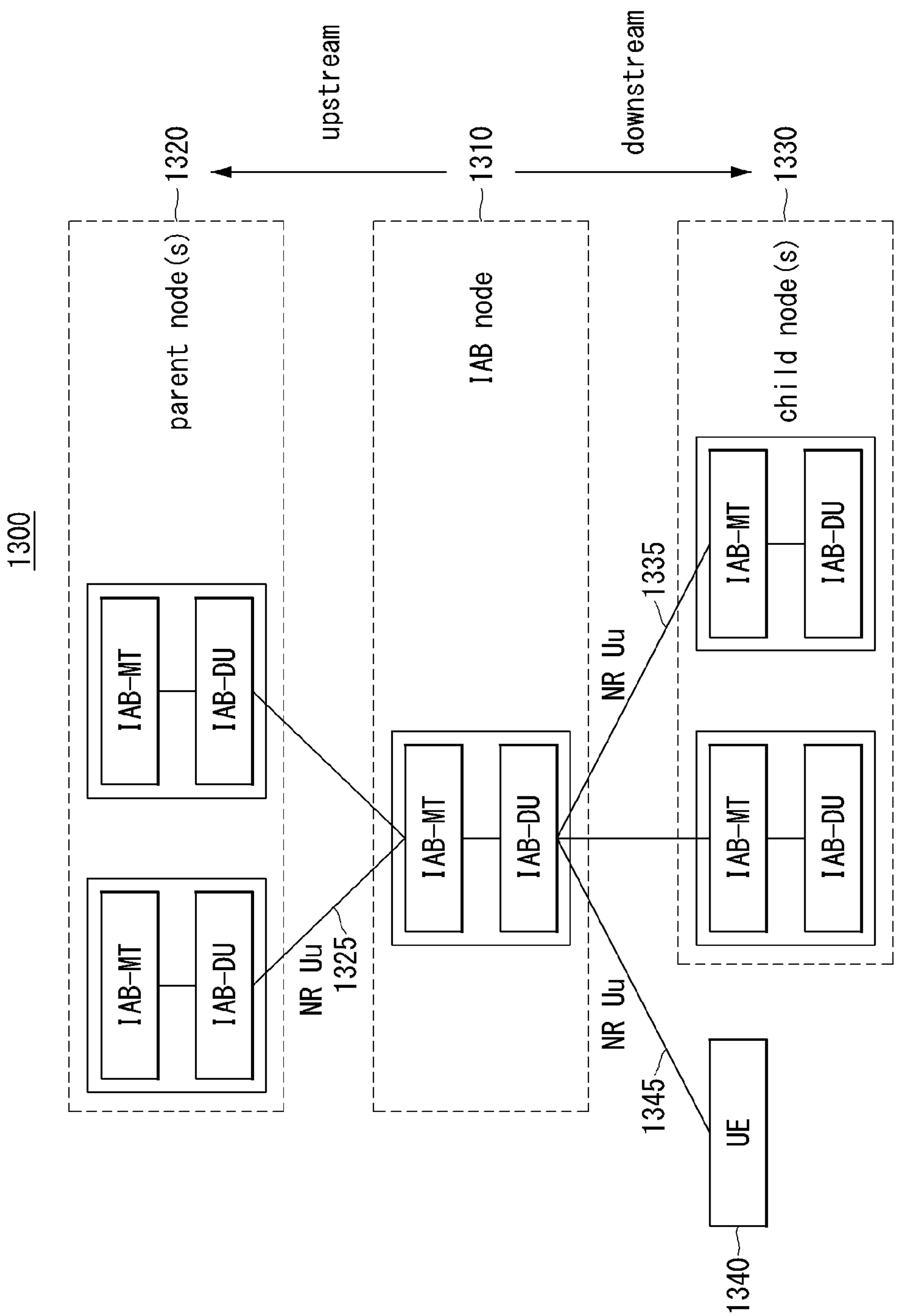
FIG. 13 is a conceptual diagram illustrating an exemplary embodiment of an IAB network in a communication system.

FIG. 13 is a conceptual diagram illustrating an exemplary embodiment of an IAB network in a communication system.

Referring to FIG. 13, a communication system 1300 may include one or more communication nodes. The communication nodes of the communication system 1300 may constitute an IAB network. For example, the communication system 1300 may include one or more IAB nodes. FIG. 13 shows an exemplary embodiment in which one IAB node communicates with one or more upper nodes and one or more lower nodes. However, this is only an example for convenience of description, and exemplary embodiments of the present disclosure are not limited thereto.

The communication system 1300 may include a plurality of IAB nodes. For example, the communication system 1300 may include a first IAB node 1310, one or more parent nodes 1320 corresponding to upper nodes of the first IAB node 1310, and/or one or more child nodes corresponding to lower nodes of the first IAB node 1310. Here, each of the one or more parent nodes 1320 may be referred to as a 'donor node'. The IAB node 1310, the one or more parent nodes 1320, and/or the one or more child nodes 1330 may constitute the IAB network. Each of the IAB nodes 1310, 1320, and 1330 constituting the IAB network may function as a type of repeater configured based on a front-haul structure. In the communication system 1300 to which the IAB network technology is applied, it is possible to support flexible and dense wireless backhaul links for each cell without support of a wired network.

Each of the IAB nodes 1310, 1320, and 1330 may include an IAB-DU and an IAB-MT. The IAB-MT may allow each IAB node to function as a terminal in communication with an upper node. For example, the first IAB node 1310 may communicate with the upper parent nodes 1320 through the IAB-MT. On the other hand, the IAB-DU may allow each IAB node to function as a base station or a cell in communication with a lower node. For example, the first IAB node 1310 may communicate with the lower child nodes 1330 or a terminal 1340 through the IAB-DU.

The IAB-MT of the first IAB node 1310 may be connected to the IAB-DUs of the parent nodes 1320 through Uu interfaces 1325. The IAB-DU of the first IAB node 1310 may be connected to the IAB-MTs of the child nodes 1330 through Uu interfaces 1335. The IAB-DU of the first IAB node 1310 may be connected to a terminal 1340 through a Uu interface 1345.

After the IAB node constituting the IAB network completely decodes a received signal, the IAB node may re-encode the decoded received signal, and amplify and transmit it. The IAB node may be classified as a type of regenerative relay. To this end, the IAB node may support a control plane (CP) and a user plane (UP) from the parent node to the terminal based on a protocol stack structure including the L1 and L2 layers, or higher layers.

The IAB node constituting the IAB network has an advantage of being able to perform various operations including operations as a base station and a terminal. On the other hand, the IAB node has disadvantages in that implementation complexity and production cost are relatively high, and a delay required for retransmission may be relatively large.

Figure 14:
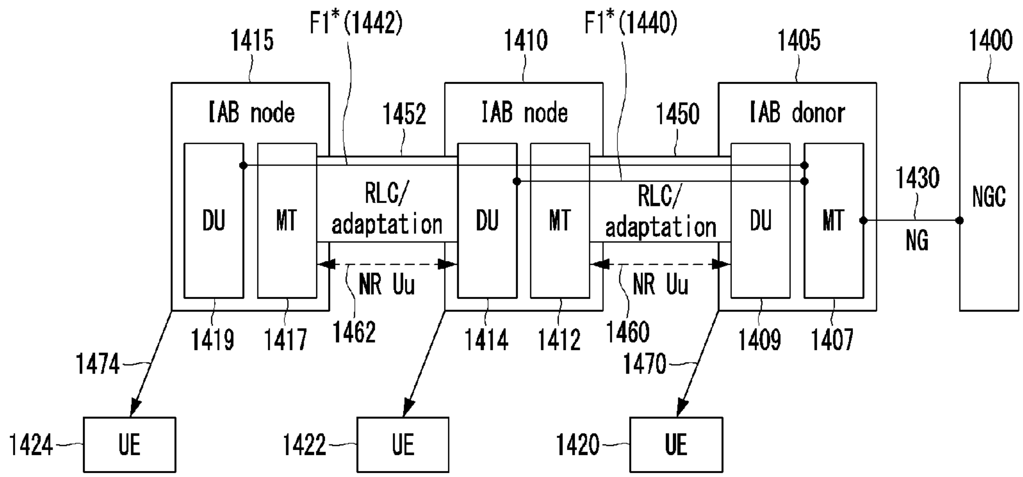
FIG. 14 is a block diagram illustrating an exemplary embodiment of a functional split structure of a central unit (CU) and a distributed unit (DU) in a communication system.

FIG. 14 is a block diagram illustrating an exemplary embodiment of a functional split structure of a central unit (CU) and a distributed unit (DU) in a communication system.

Referring to FIG. 14, in a CU-DU functional split structure in the IAB network, IAB nodes 1410 and 1415 in a two-hop chain are connected to an IAB donor 1405, and each of the IAB nodes 1410 and 1415 and terminals 1420, 1422, and 1424 may be connected to a next generation core (NGC) 1400 in a stand-alone (SA) mode. The IAB nodes 1410 and 1415 may include one DU and one MT, respectively. A certain IAB node (e.g., 1415) may be connected to the parent IAB node 1410 or the IAB donor 1405 via an MT 1417. As another example, a certain IAB node (e.g., 1410) may establish a RLC channel with the MT 1417 of the child IAB node 1415 through a DU 1414. In this case, the RLC channels 1450 and 1452 established for the MTs 1412 and 1417 may additionally include some information for IAB operations in addition to the existing components of a RLC channel for a terminal. Accordingly, the RLC channels 1450 and 1452 may be collectively referred to as 'modified RLC* (RLC*)'.

One IAB node may be connected to DUs of one or more parent IAB nodes or IAB donors. In this case, the IAB node may include a plurality of DUs, but each DU of the IAB node may have an F1-C connection 1440 or 1442 with a single IAB donor CU-CP. Even if the IAB node has a plurality of UP connections, the IAB node may operate based on a single CP connection (i.e., the IAB node may operate by being connected to a single IAB donor), so that no confusion occurs in operations of the IAB node.

The IAB donor 1405 may include the DU for supporting MTs of terminals and child IAB nodes. The IAB donor 1405 may include the CU 1407 for DUs 1409, 1414, and 1419 of itself and all child IAB nodes. It may be assumed that a certain IAB donor has a single IAB donor, and an IAB donor that manages the corresponding IAB donor may be changed by a topology adaptation function. A DU of an IAB node may be connected to a CU of the corresponding IAB donor through an F1 interface or a modified F1 interface (modified F1, F1*) (e.g., 1440, 1442). F1*-user plane (U) may be operated on the RLC channels 1450 and 1452 between the corresponding IAB-MTs 1417 and 1412 and the DUs 1414 and 1409 of the parent IAB node or donor.

Hereinafter, for convenience of description, in the present disclosure, higher layer parameters or higher layer configurations may not be limited to the above-described L2 and L3 signaling, and may collectively include information transmitted or configured through the F1 interfaces 1440 and 1442, the NG interface 1430 for connecting the CU to the NGC, the X2 interface, and the like.

Although it may seem that the slot format configuration and indication methods described with reference to FIGS. 11 and 12 are limited to terminals performing communication with the base station, this is only an example for convenience of description, and exemplary embodiments of the present disclosure are not limited thereto. For example, the slot format configuration and indication methods described with reference to FIGS. 11 and 12 may be similarly applied to the case of IAB-DU and/or IAB-MT. For example, for each serving cell of the IAB-DU, the IAB-DU may receive a higher layer parameter (e.g., IAB-DU-Resource-Configuration) for IAB-DU resource configuration, thereby configuring a slot format in each slot set. On the other hand, the IAB-MT may receive configuration information of 'slot format' over one or more slots for each serving cell through a higher layer parameter tdd-UL-DL-ConfigurationDedicated-IAB-MT from at least one upper node of the IAB-MT. When the IAB-MT receives the higher layer parameter tdd-UL-DL-ConfigurationDedicated-IAB-MT, the received higher layer parameter may substitute the higher layer parameter tdd-UL-DL-ConfigurationDedicated in the above-described slot format configuration and indication method. Specifically, the higher layer parameter tdd-UL-DL-ConfigurationDedicated-IAB-MT may include the following information.

IAB-MT slot configuration set (i.e., slotSpecificConfigurationsToAddModList-IAB-MT): A set of slot configurations Slot index (i.e., slotindex): Index of a slot included in the set of slot configurations IAB-MT symbol directions (i.e., symbols-IAB-MT): The direction of the slot indicated by the slot index.

If the IAB-MT symbol directions are all downlink (symbols-IAB-MT=allDownlink), all symbols within the corresponding slot are downlink symbols.

- If the IAB-MT symbol directions are all uplink (symbols-IAB-MT=allUplink), all symbols within the corresponding slot are uplink symbols.
- If the IAB-MT symbol directions are explicit (symbols-IAB-MT=explicit), the nrofDownlinkSymbols may indicate the number of downlink symbols located in the first part of the slot, and the nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.
- If the IAB-MT symbol directions are IAB-MT explicit (symbols-IAB-MT=explicit-IAB-MT), the nrofDownlinkSymbols may indicate the number of downlink symbols located in the first part of the slot, and the nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

Similarly to the above-mentioned normal terminal, the IAB-MT may also receive the DCI format 2_0, and through this, may receive configuration information of a slot format from the base station of the IAB-DU of the parent node. In the case of DCI format 2_0 received by the IAB-MT, candidate values of each SFI field may not be limited to the values shown in Table 5. For example, the candidate values of each SFI field of the DCI format 2_0 received by the IAB-MT may further include values shown in Table 6.

TABLE 16

| Slot for- | Symbol number within a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | U | F | D | D |
| 82 | U | U | U | U | U | U | U | U | U | U | F | F | D | D |
| 83 | U | U | U | U | U | U | U | U | U | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |

TABLE 16-continued

| Slot for- | Symbol number within a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | U | F | F | F | F | D |
| 94 | U | U | U | U | U | U | F | F | F | F | F | F | D | D |
| 95 | U | U | U | U | U | U | F | F | D | D | D | D | D | D |
| 96 | U | U | U | U | U | U | U | D | D | D | D | D | D | D |

The IAB-MT may receive information on symbols not to be used by the IAB-MT for a certain serving cell through a higher layer parameter (e.g., Provided Guard Symbols MAC CE). The IAB-MT may perform a transition (i.e., operation change) between the IAB-MT and the IAB-DU of the IAB node during a time period including the symbols not used by the IAB-MT. The base station may signal a numerology for the symbols to the terminal through a higher layer parameter (e.g., Provided Guard Symbols MAC CE).

In a cell of a certain IAB-DU, a symbol within a slot may be configured as one of three types: 'hard', 'soft', and 'unavailable (or not-available)' (HSNA).

If a certain downlink, uplink, or flexible symbol is configured as the hard type, the cell of the IAB-DU may perform a signal transmit and/or reception operation in the corresponding symbol. This may mean that the fact that a certain symbol is configured as the hard type guarantees the reflection of the downlink, uplink, or flexible symbol configuration of the IAB-DU for the corresponding symbol.

Specifically, in an exemplary embodiment of the communication system, an F1 application protocol (F1AP) signaling as shown in Table 7 may be provided, and the upper IAB node (e.g., IAB donor, parent node, core network, etc.) may configure a DU resource type of the lower IAB node (e.g., IAB node, child node). Referring to Table 7, information of the DU resource type may include one HSNA slot configuration list consisting of one or more HSNA slot configurations. In this case, one HSNA slot configuration list may include HSNA slot configurations according to the maximum number of HSNAs (e.g., maxnoofHSNA). The n-th HSNA slot configuration included in the HSNA slot configuration list may include information on whether to apply the hard type, soft type, or not-available type to each of downlink symbols, uplink symbols, and flexible symbols of the n-th slot according to an application periodicity and a starting time of the HSNA slot configuration list.

TABLE 7

| IE/group name | range | IE type and reference | liminality |
|---|---|---|---|
| HSNA slot configuration list | 0 . . . 1 | | |
| >HSNA slot configuration item | 1 . . . <maxnoofHSNASlots> | | |
| >>HSNA (Downlink) | | Enumerated (H, S, NA) | HSNA value for a downlink symbol of a slot |
| >>HSNA (Uplink) | | Enumerated (H, S, NA | HSNA value for a uplink symbol of a slot |

TABLE 7-continued

| IE/group name | range | IE type and reference | liminality |
|---|---|---|---|
| >>HSNA (Flexible) | | Enumerated (H, S, NA | HSNA value for a flexible symbol of a slot |

If a certain downlink, uplink, or flexible symbol is configured as the soft type, the IAB-DU cell may perform a signal transmission and reception operation in the symbol when at least one of the following conditions is satisfied.

Condition 1: The IAB-MT (co-located/associated with the IAB-DU) does not perform transmission or reception in the corresponding symbol.

Condition 2: The IAB-MT (co-located/associated with the IAB-DU) can perform transmission or reception in the corresponding symbol, but the transmission/reception operation of the IAB-MT does not change due to the use of the symbol at the IAB-DU.

Condition 3: The IAB-MT (co-located/associated with the IAB-DU) receives a DCI format 2_5 indicating the corresponding soft symbols as 'available'.

If a certain downlink, uplink, or flexible symbol is configured as the 'unavailable (or not-available (NA)) type', the IAB-DU (i.e., cell) may not perform transmission or reception in the symbol.

If the IAB-DU transmits one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

SS/PBCH block, CSS set for a type0-PDCCH configured by a system information block 1 (SIB1) for PDCCH configuration (i.e., PDCCHs for a type0-PDCCH CSS sets configured by pdcchConfigSIB1), periodic CSI-RS, and/or the like If the IAB-DU receives one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

PRACH, scheduling request (SR)

Following information may be configured for each cell in the set of cells of the IAB-DU.

IAB-DU cell identifier (i.e., iabDuCellld-AI): Identifier of the IAB-DU cell

AI position within DCI format (i.e., positionInDCI-AI): Position of an availability identifier (AI) index field within the DCI format 2_5.

Availability combinations (i.e., availabilityCombinations): includes a list of the following two pieces of information for availability combinations.

Resource availability (i.e., resourceAvailability): indicates resource availability for soft symbols included in one or more slots of the IAB-DU cell. The availability of soft symbols within one slot may be determined by referring to values in Table 17.

Availability combination identifier (i.e., availabilityCombinationId): indicates a mapping between the resource availability (i.e., resourceAvailability) and the AI index field in the DCI format 2_5.

As described above, in the DCI format 2_5, one AI index field may indicate to the IAB-DU the availability of soft symbols included in each slot in a certain slot set. In this case, the slot set may start from the earliest slot among the slots of the IAB-DU overlapping in the time axis with the slot in which the IAB-MT detects the corresponding DCI format 2_5. In addition, the size of the slot set may be greater than or equal to a PDCCH monitoring periodicity of the DCI format 2_5 given from a higher layer parameter SearchSpace. The AI index field of the DCI format 2_5 may include max{[log2(maxAlindex)], 1} bits and may be mapped to one of the values of Table 17. In this case, the maximum value of the AI index (i.e., maxAlindex) may mean a maximum value among the provided availability combination identifiers (i.e., availabilityCombinationld). Table 8 may indicate a mapping relationship between the resource availability value and the soft symbol type within one slot.

TABLE 8

| Value | Indication |
|---|---|
| 0 | No indication of availability for soft symbols |
| 1 | Indicates that downlink symbols are available.<br>No indication of availability for uplink and flexible soft symbols |
| 2 | Indicates that uplink symbols are available.<br>No indication of availability for downlink and flexible soft symbols |
| 3 | Indicates that downlink and uplink soft symbols are available.<br>No indication of availability for flexible soft symbols |
| 4 | Indicates that flexible soft symbols are available.<br>No indication of availability for downlink and uplink soft symbols |
| 5 | Indicates that downlink and flexible soft symbols are available.<br>No indication of availability for uplink soft symbols |
| 6 | Indicates that uplink and flexible soft symbols are available.<br>No indication of availability for downlink soft symbols |
| 7 | Indicates that downlink, uplink, and flexible soft symbols are available |

As described above, the upper IAB node including the IAB donor may indicate whether the lower IAB node uses the soft symbols based on the DCI format 2_5 and the contents of Table 17. On the other hand, such the function may be designed assuming that the IAB node operates in a half-duplex manner. In other words, such the function may be designed mainly assuming that the MT and DU of the IAB node operate in a time division multiplexing (TDM) scheme or time division duplexing (TDD) scheme.

In an exemplary embodiment of the communication system, the F1AP signaling as shown in Table 18 may be used. Through this, the IAB node may report or deliver, to the upper IAB node (e.g., IAB donor or parent node), multiplexing information on a multiplexing capability between the IAB-DU of the IAB node (or, cell of a gNB-DU) and the IAB-MT of the IAB node (or, a cell configured in a co-located IAB-MT). Referring to Table 18, the multiplexing information may include one IAB-MT cell list composed of information on one or more IAB-MT cells. In this case, one IAB-MT cell list may include IAB-MT cell information according to the maximum number of serving cells (i.e., maxnoofServingCells). The n-th IAB-MT cell information included in the IAB-MT cell list may include a NR cell identity (ID) information of the corresponding cell and information on whether the following four types of multiplexing are supported.

DU_RX/MT_RX multiplexing: informs whether the IAB node supports simultaneous receptions in the DU and the MT DU_TX/MT_TX multiplexing: informs whether the IAB node supports simultaneous transmissions in the DU and the MT DU_TX/MT_RX multiplexing: informs whether the IAB node can simultaneously perform transmission in the DU and reception in the MT DU_RX/MT_TX multiplexing: informs whether the IAB node can simultaneously perform reception in the DU and transmission in the MT

TABLE 9

| IE/group name | range | IE type and reference | liminality |
|---|---|---|---|
| IAB-MT cell list | 1 | | |
| >IAB-MT cell item | 1.. <maxnoofServingCells> | | |
| >>NR cell identity | | Bit string (size: 36) | Identity of a serving cell configured for a co-located IAB-MT |
| >>DU_RX/ MT_RX | | Enumerated (supported, not-supported) | Indicates whether the IAB node supports simultaneous receptions in DU and MT |
| >>DU_TX/ MT_TX | | Enumerated (supported, not-supported) | Indicates whether the IAB node supports simultaneous transmissions in DU and MT |
| >>DU_TX/ MT_RX | | Enumerated (supported, not-supported) | Indicates whether the IAB node simultaneously supports transmission in DU and reception in MT |
| >>DU_RX/ MT_TX | | Enumerated (supported, not-supported) | Indicates whether the IAB node simultaneously supports reception in DU and transmission in MT |

Figure 15:
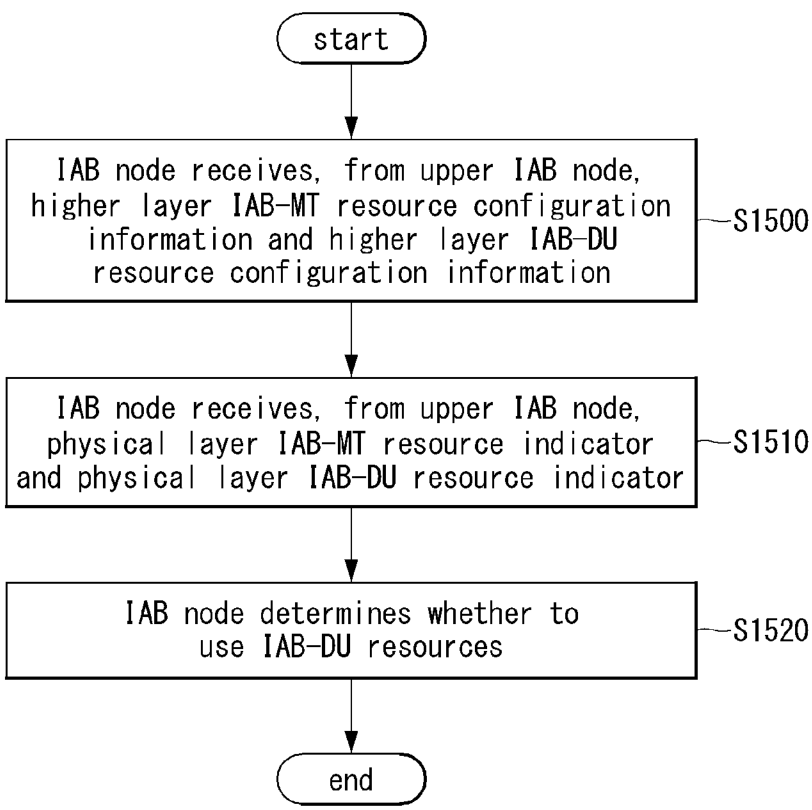
FIG. 15 is a flowchart illustrating a first exemplary embodiment of a method for resource management of an IAB node in a communication system.

FIG. 15 is a flowchart illustrating a first exemplary embodiment of a method for resource management of an IAB node in a communication system.

FIG. 15 shows a first exemplary embodiment of the method for resource management of an IAB node by taking the operation of the IAB node determining whether to use the IAB-DU resources as an example. However, this is only an example for convenience of description, and exemplary embodiments of the present disclosure are not limited thereto. For example, in the present disclosure, configurations described for 'whether to use IAB-DU resources' may be applied similarly or identically also to 'whether to use IAB node resources', 'whether to use IAB-MT resources', 'whether to use DU/MT simultaneous operation resources', and the like.

Referring to FIG. 15, in the order of determining whether to use the IAB-DU resources of the IAB node, the IAB node may identify whether the corresponding IAB-DU resources are available, and in order to determine whether to use the IAB-DU resources, may receive, from the upper IAB node, at least one of higher layer IAB-MT resource configuration information and higher layer IAB-DU resource configuration information (S1500). As an example, the higher layer IAB-MT resource configuration information may include slot configuration (i.e., downlink/uplink/flexible (DUF)) information and symbol configuration information for a cell (or cell group) of the IAB-MT. As another example, the higher layer IAB-DU resource configuration information may include slot configuration (i.e., downlink/uplink/flexible (DUF)) information and symbol configuration information for a cell (or cell group) of the IAB-DU. The higher layer IAB-DU resource configuration information may include type (i.e., hard, soft, or not-available) information of the IAB-DU resources configured by the upper IAB node. The higher layer IAB-DU resource configuration information may include a part or all of cell-specific/semi-static downlink signals and channels such as SSB(s), type 0-PDCCH CSS set configured by a SIB1 for PDCCH configuration, CSI-RS, etc. configured in a cell (or cell group) configured to the IAB-DU. The higher layer IAB-DU resource configuration information may include a part or all of cell-specific/semi-static downlink signals and channels such as PRACH, SR, etc. configured in a cell (or cell group) configured to the IAB-DU.

In addition to the above-described higher layer configuration, the IAB node may receive at least one of a physical layer (L1 signaling) IAB-MT resource indicator and a physical layer IAB-DU resource indicator from the upper IAB node (S1510). As an example, the physical layer IAB-MT resource indicator may be a DCI format 2_0 including a slot format indicator for a cell (or a set of cells) which is configured to the IAB-MT. As another example, the physical layer IAB-DU resource indicator may be a DCI format 2_5 including a soft resource AI of the IAB-DU.

Finally, the IAB node may finally determine whether to use the IAB-DU resources based on the higher layer signaling (S1500) and the L1 signaling (S1510) (S1520).

Figure 16:
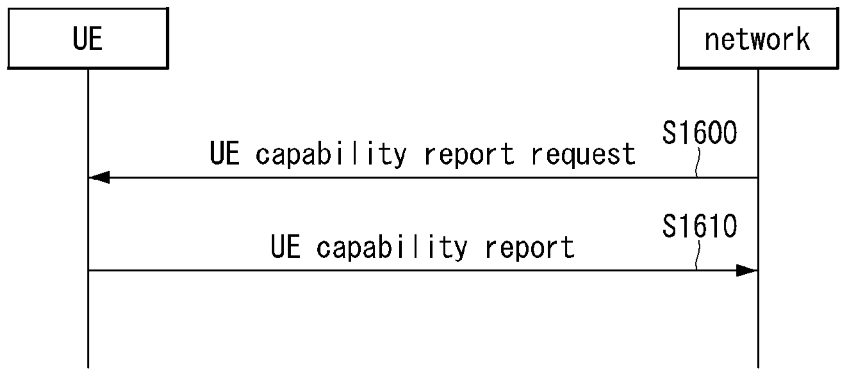
FIG. 16 is a sequence chart illustrating an exemplary embodiment of a UE capability reporting procedure in a communication system.

FIG. 16 is a sequence chart illustrating an exemplary embodiment of a UE capability reporting procedure in a communication system.

Referring to FIG. 16, in the UE capability reporting procedure, the base station may transmit a UE capability report request signal to the terminal through a higher layer parameter UECapabilityEnquiry when the terminal is in RRC connected mode (i.e., RRC_CONNECTED state) (S1600). In this case, the network may refer to only the UE capability report after access stratum (AS) security activation, and may not retransmit or report the UE capability report before the AS security activation to the core network (CN). Upon receiving the UE capability report request signal, the terminal may compile UE capability information according to a specific procedure, and report it to the base station through a UE capability information signal (e.g., UECapabilityInformmation) (S1610).

The specific procedure for compiling the UE capability information signal may include a procedure of generating at least one of a list (i.e., supportedBandCombinationList) of band(s) or band combination(s) (BC(s)) supported by the terminal, feature set (FS) information related to feature sets supported by the terminal, or feature set combination (FSC) information related to feature set combinations supported by the terminal. For example, when the base station requests a UE capability report from the terminal in order to obtain information on band(s) or band combination(s) supported by the terminal, the terminal may report which band(s) it supports for each radio access technology (RAT). To this end, the base station may set a RAT-type in a UE RAT capability report request signal (e.g., UE-CapabilityRAT-Request), which is included in a UE RAT capability report request list signal (e.g., ue-CapabilityRAT-RequestList) that is a higher layer message, to one of 'nr', 'eutra-nr', 'eutra', and 'eutra-fdd'. This may mean that the base station may request a UE capability report for one or more RATs or RAT combinations from the terminal, and in this case, the terminal may respond to each request for a list of support bands for a plurality of RATs or RAT combinations. For example, if the RAT-type is set to 'nr', the terminal may include a list of bands or band combinations to which NR-DC can be applied in the UE capability report. As another example, if the RAT-type is set to 'cutra-nr', the terminal may include a list of bands or band combinations applicable to multi-RAT DC (MR-DC) such as EN-DC, NGEN-DC, NE-DC, or the like in the UE capability report. In addition, when the base station requests a UE capability report, the base station may provide, to the terminal, a list of bands for which the terminal determines whether support is provided, through a higher layer parameter frequencyBandListFilter. For the bands included in the higher layer parameter frequencyBandListFilter, the terminal may determine a candidate band combination by considering 'predetermined RAT types supported for each band', 'information on RAT-types requested by the base station', etc., and may include the candidate band combination in the UE capability report.

In the 5G communication system, the base station may provide information related to a transmission power between each downlink channel and signal for the purpose of improving channel or signal reception and quality measurement accuracy of the terminal and reducing implementation complexity. The information related to the transmission power may explicitly inform a transmission power value of a certain signal or channel, or may implicitly signal a ratio between transmission powers of two different channels and signals.

The UE capability reporting described with reference to any one of FIGS. 9 to 16 may be performed between the terminal and the base station. Meanwhile, similarly to that described with reference to FIG. 13, a relation between the IAB node or the IAB-MT and the upper node may correspond to a relation between the terminal and the base station. The IAB node or the IAB-MT may transmit the UE capability report described with reference to any one of FIGS. 9 to 16 to the upper node. Meanwhile, a relation between the IAB node or the IAB-DU and the lower node may correspond to the relation between the base station and the terminal. The IAB node or the IAB-DU may receive the UE capability report described with reference to any one of FIGS. 9 to 16 from the lower node. The IAB node may perform communications with the upper node or lower node based on the UE capability report transmitted and received with the upper node or lower node.

In an exemplary embodiment of the communication system, the IAB node may be designed based on a time division multiplexing (TDM) scheme between the IAB-DU and the IAB-MT. Here, a slot format of a cell of the IAB-MT for communication or upstream between the IAB node and the upper node may be configured statically or indicated dynamically. A slot format of a cell of the IAB-DU cell for communication or downstream between the IAB node and the lower node may be configured statically or indicated dynamically. The type of downlink, uplink, or flexible symbols of the cell of the IAB-DU may be configured to be any one of hard (H)-type, soft (S)-type, and not-available (NA)-type. Whether to use the S-type symbols of the cell of the IAB-DU may be dynamically indicated.

On the other hand, in an exemplary embodiment of the communication system, the IAB node may be designed to support a multiplexing scheme that allows simultaneous transmissions rather than the TDM scheme. The multiplexing scheme allowing simultaneous transmissions may mean a frequency division multiplexing (FDM) scheme or a spatial division multiplexing (SDM) scheme. In other words, the IAB node may be designed to support simultaneous operations (SO) of the IAB-MT and the IAB-DU. In order to maximize communication capacity or reduce implementation complexity in the IAB node designed to support simultaneous operations of the IAB-MT and the IAB-DU, configuration and indication schemes different from those used in the IAB node designed to support the aforementioned TDM scheme may be needed.

In an exemplary embodiment of the IAB node designed to support simultaneous operations of the IAB-MT and the IAB-DU, the IAB-MT and IAB-DU may operate based on any one simultaneous operation scheme among the following cases A to F.

- Case A (DU Tx/MT Tx): IAB-DU performs downlink transmission and IAB-MT performs uplink transmission at the same time point (symbol).
- Case B (DU Rx/MT Rx): IAB-DU performs uplink reception and IAB-MT performs downlink reception at the same time point (symbol).
- Case C (DU Rx/MT Tx): IAB-DU performs uplink reception and IAB-MT performs uplink transmission at the same time point (symbol).
- Case D (DU Tx/MT Rx): IAB-DU performs downlink transmission and IAB-MT performs downlink reception at the same time point (symbol).
- Case E (DU/MT FDM required): For simultaneous operations of IAB-DU and IAB-MT, radio resources of IAB-DU and IAB-MT should be FDMed.
- Case F (DU/MT SDM required): For simultaneous operations of IAB-DU and IAB-MT. radio resources of IAB-DU and IAB-MT should be SDMed.

The IAB-DU and the IAB-MT operating simultaneously based on one of the cases A to F may be included in one IAB node, or may be considered to constitute one IAB node. In other words, the IAB-DU and the IAB-MT operating simultaneously based on one of the cases A to F may be regarded as being co-located. Here, when interference control capability of the IAB-DU and/or the IAB-MT is relatively limited, the case E may be applied, and when interference control capability of the IAB-DU and/or the IAB-MT is relatively excellent, the case F may be applied.

In an exemplary embodiment of the communication system, the IAB node (or IAB-DU and IAB-MT) may support at least one of the four simultaneous operation schemes of the cases A to D. The IAB node (or IAB-DU and IAB-MT) may report information on one or more simultaneous operation schemes supported by the IAB node to an upper node of the IAB node. Alternatively, the IAB node (or IAB-DU and IAB-MT) may report information on one or more combinations of a plurality of simultaneous operation schemes supported by the IAB node to the upper node of the IAB node. Here, the 'upper node of the IAB node' may correspond to an upper IAB node, an IAB donor node, a parent node, a central unit (CU), a core network, or the like. Reporting accordingly may be performed in the same or similar manner as that shown in Table 9.

Meanwhile, in another exemplary embodiment of the communication system, the IAB node (or IAB-DU and IAB-MT) may support at least one or more of the six simultaneous operation schemes of the cases A to F. The IAB node (or IAB-DU and IAB-MT) may report information on one or more simultaneous operation schemes supported by the IAB node to the upper node. Alternatively, the IAB node (or IAB-DU and IAB-MT) may report information on one or more combinations of a plurality of simultaneous operation schemes supported by the IAB node to the upper node. Reporting accordingly may be performed in the same or similar manner as that shown in Table 10.

TABLE 10

| IE/Group Name | Range | IE type and reference | Semantics description |
| --- | --- | --- | --- |
| IAB-MT Cell List | 1 | | |
| >IAB-MT Cell Item | 1..<maxnoofServingCells> | | |
| >>NR Cell Identity | | BIT STRING (SIZE (36)) | Cell identity of a serving cell configured for a collocated IAB-MT. |
| >>DU_RX/MT_RX | | ENUMERATED (supported, not supported) | An indication of whether the IAB-node supports simultaneous reception at its DU and MT side. |
| >>DU_TX/MT_TX | | ENUMERATED (supported, not supported) | An indication of whether the IAB-node supports simultaneous transmission at its DU and MT side. |
| >>DU_TX/MT_RX | | ENUMERATED (supported, not supported) | An indication of whether the IAB-node supports simultaneous transmission at its DU and reception at its MT side. |
| >>DU_RX/MT_TX | | ENUMERATED (supported, not supported) | An indication of whether the IAB-node supports simultaneous reception at its DU and transmission at its MT side. |
| >>DU/MT FDM required | | ENUMERATED (supported, not supported) | An indication of whether the IAB node supports (or requires) the FDM scheme |
| >>DU/MT SDM required | | ENUMERATED (supported, not supported) | An indication of whether the IAB node supports (or requires) the SDM scheme |

The report according to Table 10 may further include elements corresponding to the aforementioned cases E and F, in addition to the elements constituting the report according to Table 9.

Hereinafter, 'Case A', 'Case B', 'Case C', 'Case D', 'Case E', and 'Case F' in the present disclosure may refer to the aforementioned cases A to F, respectively. In the present disclosure, a term 'HSNA type' may refer to at least one of the H-type, S-type, or NA-type configured for a slot or symbol constituting a time resource, and a term 'HSNA slot configuration' may refer to a message or signal for configuring an HSNA type for each slot (or symbol).

First Exemplary Embodiment of Communication System

In a first exemplary embodiment of the communication system, configurations related to IAB node resource management operations for simultaneous DU/MT operations, based on extension of the HSNA slot configuration and the L1 signaling (e.g., DCI format 2-5, etc.) for S symbol(s) are proposed.

In the first exemplary embodiment of the communication system, an HSNA slot configuration extended from the same or similar HSNA slot configuration as shown in Table 7. For example, in the first exemplary embodiment of the communication system, a slot configuration (or slot configuration list) for (semi-)static configuration and dynamic indication of simultaneous DU/MT operations may be added to the HSNA slot configuration shown in Table 7. This may mean that in addition to the existing HSNA slot configuration, an ‘HSNA slot configuration for simultaneous operations’ or ‘HSNA slot configuration list for simultaneous operations’ may be configured independently. Hereinafter, in the first exemplary embodiment of the communication system, the ‘HSNA configuration for simultaneous operations’ may refer to the above-mentioned ‘HSNA slot configuration for simultaneous operations’ or ‘HSNA slot configuration list for simultaneous operations’.

According to the HSNA configuration for simultaneous operations, various applications may be possible depending on situations based on a high degree of freedom in configuration. For example, in an exemplary embodiment of the communication system, simultaneous operations may be applied only to downlink H-type symbols. The ‘static configuration of simultaneous DU/MT operation scheme’ for statically configuring a simultaneous operation scheme of DU and MT may include at least one type of the H-type, S-type, and NA-type. Here, the H-type may mean that an operation according to one of Cases A to D (or Cases A to case F) may be applied regardless of L1 signaling. The NA-type may mean that simultaneous DU/MT operations are impossible regardless of signaling. The S-type may mean that whether to perform simultaneous DU/MT operations may be indicated by L1 signaling. Table 11 shows a first exemplary embodiment of the static configuration of the simultaneous operation scheme of DU/MT.

TABLE 11

| IE/Group Name | Range | IE type and reference | Semantics description |
|---|---|---|---|
| HSNA Slot Configuration List | 0..1 | | |
| >HSNA Slot Configuration Item | 1..<maxnoofHSNASlots> | | |
| >>HSNA Downlink | | ENUMERATED (H, S, NA) | HSNA value for downlink symbols in a slot. |
| >>HSNA Uplink | | ENUMERATED (H, S, NA) | HSNA value for uplink symbols in a slot. |
| >>HSNA Flexible | | ENUMERATED (H, S, NA) | HSNA value for flexible symbols in a slot. |
| HSNA Slot Configuration List for simultaneous operation | 0..1 | | |
| >HSNA Slot Configuration Item | 1..<maxnoofHSNASlots> | | |
| >> DU Tx / MT Tx (case A) | | ENUMERATED (H, S, NA) | HSNA value for Case A. |
| >> DU Rx / MT Rx (case B) | | ENUMERATED (H, S, NA) | HSNA value for Case B. |
| >> DU Rx / MT Tx (case C) | | ENUMERATED (H, S, NA) | HSNA value for Case C. |
| >> DU Tx / MT Rx (case D) | | ENUMERATED (H, S, NA) | HSNA value for Case D. |
| >>DU/MT FDM required (case E, optional) | | ENUMERATED (H, S, NA) | HSNA value for Case E. |
| >>DU/MT SDM required (case F, optional) | | ENUMERATED (H, S, NA) | HSNA value for Case F. |

Referring to Table 11, the upper node of the IAB node (or IAB-DU and/or IAB-MT constituting the IAB node) may configure an HSNA value to the IAB node. Specifically, for each slot (or, symbol, subframe, frame, etc.) within a predetermined slot set (or, symbol set, subframe set, frame set, etc.), the upper node may configure one or more HSNA values (i.e., simultaneous operation HSNA values) to the LAB node for the simultaneous operation schemes shown in Table 11. Here, the upper node may refer to or consider the information on the simultaneous operation capability of DU/MT reported from the IAB node based on the signaling shown in Table 9. In other words, the simultaneous operation HSNA value violating the simultaneous operation capability reported by the IAB node may not be configured to each IAB node. Alternatively, the IAB node may ignore the configured simultaneous operation HSNA value when the simultaneous operation HSNA value violating the simultaneous operation capability reported by the IAB node is configured. In Table 11, the rows corresponding to each case may not necessarily have to be independent, and it may be possible to change, for example, a combination of simultaneous operation schemes according to a situation.

Table 12 shows a second exemplary embodiment of the static configuration of the simultaneous operation scheme of DU/MT.

TABLE 12

| IE/Group Name | Range | IE type and reference | Semantics description |
|---|---|---|---|
| HSNA Slot Configuration List | 0..1 | | |
| >HSNA Slot Configuration Item | 1..<maxnoofHSNASlots> | | |
| >>HSNA Downlink | | ENUMERATED (H, S, NA) | HSNA value for downlink symbols in a slot. |
| >>HSNA Uplink | | ENUMERATED (H, S, NA) | HSNA value for uplink symbols in a slot. |
| >>HSNA Flexible | | ENUMERATED (H, S, NA) | HSNA value for flexible symbols in a slot. |
| HSNA Slot Configuration List for simultaneous operation | 0..1 | | |
| >HSNA Slot Configuration Item | 1..<maxnoofHSNASlots> | | |
| >>HSNA Simultaneous Operation | | ENUMERATED (H, S, NA) | HSNA value for flexible symbols in a slot. |

Referring to Table 12, the upper node of the IAB node (or IAB-DU and/or IAB-MT constituting the IAB node) may configure an HSNA value for each slot to the IAB node based on the information in the 'HSNA Simultaneous Operation' row of Table 12. Here, the upper node may refer to or consider the information on the simultaneous operation capability of the DU/MT reported from the IAB node based on the signaling shown in Table 9. Here, the meaning of the 'HSNA Simultaneous Operation' row may be promised between the IAB node and the upper node through the capability reporting performed in the same or different manner as in Table 9.

Table 13 shows a third exemplary embodiment of the static configuration of the DU/MT simultaneous operation scheme.

TABLE 13

| IE/Group Name | Range | IE type and reference | Semantics description |
|---|---|---|---|
| HSNA Slot Configuration List | 0..1 | | |
| >HSNA Slot Configuration Item | 1..<maxnoofHSNASlots> | | |
| >>HSNA Downlink | | ENUMERATED (H, S, NA) | HSNA value for downlink symbols in a slot. |
| >>HSNA Uplink | | ENUMERATED (H, S, NA) | HSNA value for uplink symbols in a slot. |
| >>HSNA Flexible | | ENUMERATED (H, S, NA) | HSNA value for flexible symbols in a slot. |
| >>HSNA Simultaneous Operation | | ENUMERATED (H, S, NA) | HSNA value for flexible symbols in a slot. |

Referring to Table 13, the static configuration of the DU/MT simultaneous operation scheme may be configured such that the 'HSNA Simultaneous Operation' row described with reference to Table 12 is included in an 'HSNA Slot Configuration Item'.

Table 14 shows a fourth exemplary embodiment of the static configuration of the DU/MT simultaneous operation scheme.

TABLE 14

| IE/Group Name | Range | IE type and reference | Semantics description |
|---|---|---|---|
| HSNA Slot Configuration List | 0..1 | | |
| >HSNA Slot Configuration Item | 1..<maxnoofHSNASlots> | | |
| >>HSNA Downlink | | ENUMERATED (H, S, NA) | HSNA value for downlink symbols in a slot. |
| >>HSNA Uplink | | ENUMERATED (H, S, NA) | HSNA value for uplink symbols in a slot. |
| >>HSNA Flexible | | ENUMERATED (H, S, NA) | HSNA value for flexible symbols in a slot. |
| >> DU Tx / MT Tx (case A) | | ENUMERATED (H, S, NA) | HSNA value for Case A. |
| >> DU Rx / MT Rx (case B) | | ENUMERATED (H, S, NA) | HSNA value for Case B. |
| >> DU Rx / MT Tx (case C) | | ENUMERATED (H, S, NA) | HSNA value for Case C. |
| >> DU Tx / MT Rx (case D) | | ENUMERATED (H, S, NA) | HSNA value for Case D. |
| >>DU/MT FDM required (case E, optional) | | ENUMERATED (H, S, NA) | HSNA value for Case E. |
| >>DU/MT SDM required (case F, optional) | | ENUMERATED (H, S, NA) | HSNA value for Case F. |

Referring to Table 14, the static configuration of the DU/MT simultaneous operation scheme may be configured such that rows corresponding to the respective cases described with reference to Table 11 are included in the 'HSNA Slot Configuration Item'.

The HSNA slot configuration may be extended in the same or similar manner as the method described with reference to any one of Tables 11 to 14. In this case, the IAB node (or IAB-DU and/or IAB-MT constituting the IAB node) may finally determine whether to perform simultaneous transmissions in simultaneous operation S-type resources based on predetermined signaling (e.g., L1 signaling, etc.). Here, the signaling may correspond to a DCI format 2_5 received by the IAB node or the IAB-MT from the upper node. Here, a mapping relationship between AI index field values of the DCI format 2_5 and availability of S-type symbols within a slot may be extended as shown in Table 15 from those shown in Table 8. To this end, in an exemplary embodiment of the communication system, a payload of each AI index field of the DCI format 2_5 may be extended from 3 bits to 4 bits.

TABLE 15

| Value | Indication |
|---|---|
| 0 | No indication of availability for soft symbols |
| 1 | DL soft symbols are indicated available<br>No indication of availability for UL and Flexible soft symbols |
| 2 | UL soft symbols are indicated available<br>No indication of availability for DL and Flexible soft symbols |
| 3 | DL and UL soft symbols are indicated available<br>No indication of availability for Flexible soft symbols |
| 4 | Flexible soft symbols are indicated available<br>No indication of availability for DL and UL soft symbols |
| 5 | DL and Flexible soft symbols are indicated available<br>No indication of availability for UL soft symbols |
| 6 | UL and Flexible soft symbols are indicated available<br>No indication of availability for DL soft symbols |
| 7 | DL, UL, and Flexible soft symbols are indicated available |
| 8 | DL soft resources at {frequency resource #A, beam (set) #a} are indicated available<br>No indication of availability for UL and Flexible soft resources |

TABLE 15-continued

| Value | Indication |
| --- | --- |
| 9 | UL soft resources at {frequency resource #A, beam (set) #a} are indicated available<br>No indication of availability for DL and Flexible soft resources |
| 10 | DL and UL soft resources at {freq. resource #A, beam (set) #a} are indicated available<br>No indication of availability for Flexible soft resources |
| 11 | Flexible soft resources at {frequency resource #A, beam (set) #a} are indicated available<br>No indication of availability for DL and UL soft resources |
| 12 | DL and Flexible soft resources at {freq. resource #A, beam (set) #a} are indicated available<br>No indication of availability for UL soft resources |
| 13 | UL and Flexible soft resources at {freq. resource #A, beam (set) #a} are indicated available<br>No indication of availability for DL soft resources |
| 14 | DL, UL and Flexible, soft resources at {freq. resource #A, beam (set) #a} are indicated available |
| 15 | Reserved |

Referring to Table 15, in an exemplary embodiment of the communication system, the upper IAB node may indicate information according to values 0 to 7 of Table 15 (i.e., information on whether the IAB-DU can use D/U/F soft symbols based on the DU/MT TDM operation) as well as information according to values 8 to 14 of Table 15 (i.e., information on whether SO soft symbols can be used based on the DU/MT FDM or SDM operation). Here, the information according to values 0 to 7 of Table 15 may be the same as or similar to the information according to Table 8. The IAB node may need a criterion for determining whether to follow the mapping of Table 8 or the mapping of Table 15. For example, when the IAB node receives a configuration according to one of Tables 11 to 14, it may be regarded that the IAB node is implicitly instructed to follow the mapping of Table 15. Alternatively, a separate higher layer parameter that explicitly indicates whether the IAB node follows the mapping of Table 8 or the mapping of Table 15 may be introduced.

In an exemplary embodiment of the communication system, the values 8 to 14 of Table 15 are only examples for convenience of description of the availability indication scheme for SO soft symbols in an exemplary embodiment of the communication system, and exemplary embodiments of the present disclosure are limited thereto. For example, in another exemplary embodiment of the communication system, some omissions, additions, or changes may be made for the values 8 to 14 of Table 15.

In an exemplary embodiment of the communication system, the HSNA slot configuration schemes described with reference to Tables 11 to 14 and the AI mapping extension scheme described with reference to Table 15 may not need to be mutually exclusive, and may be simultaneously applied according to a circumstance. In an exemplary embodiment of the communication system, the exemplary embodiments described with reference to Tables 11 to 15 may be limitedly applied to a cell in which simultaneous operations can be performed, based on the simultaneous operation capability report of the IAB node (or IAB-DU and/or IAB-MT constituting the IAB node) described with reference to Table 8.

Figure 17:
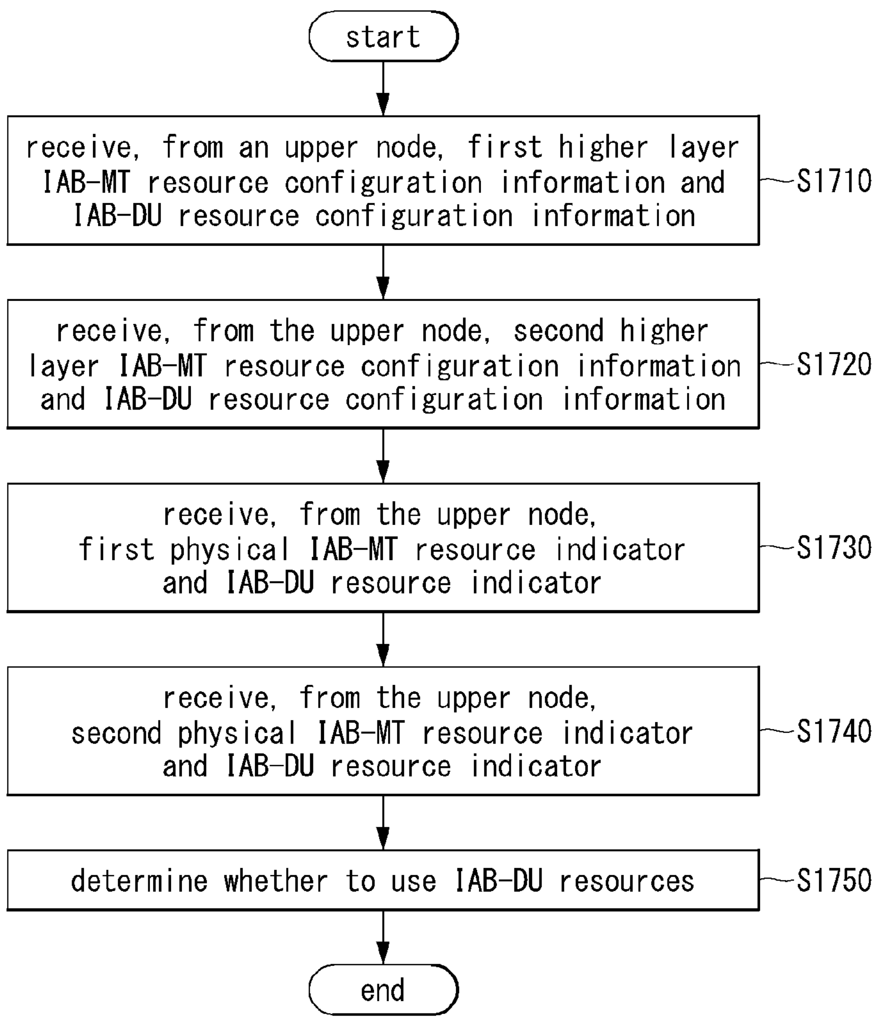
FIG. 17 is a flowchart illustrating a second exemplary embodiment of a method for resource management of an IAB node in a communication system.

FIG. 17 is a flowchart illustrating a second exemplary embodiment of a resource management method of an IAB node in a communication system.

FIG. 17 shows a second exemplary embodiment of the resource management method of the IAB node by taking an operation for the IAB node to determine whether IAB-DU resources are used as an example. However, this is only an example for convenience of description, and exemplary embodiments of the present disclosure are not limited thereto. For example, the configurations described for 'whether to use IAB-DU resources' in the present disclosure may be identically or similarly applied to 'whether to use IAB-node resources', 'whether to use IAB-MT resources', 'whether to use DU/MT simultaneous operation resources', and/or the like.

Referring to FIG. 17, in order to identify whether the IAB-DU resources can be used and determine whether to use the IAB-DU resources, the IAB node may receive at least one of first higher layer IAB-MT resource configuration information and first higher layer IAB-DU resource configuration information from the upper node of the IAB node (S1710). Here, the 'upper node of the IAB node' may correspond to an upper IAB node, IAB donor node, parent node, central unit (CU), or core network.

In an exemplary embodiment of the communication system, the first higher layer IAB-MT resource configuration information may include configuration of D/U/F slots and symbols for a cell (or set of cells) configured to the IAB-MT. The first higher layer IAB-MT resource configuration information may include information on all or some of cell-specific/semi-static downlink signals and channels such as SSB, PDCCH for Type0-PDCCH CSS sets configured by pdcchConfigSIB1, CSI-RS, etc. configured in the cell (or set of cells) configured to the IAB-MT. The first higher layer IAB-MT resource configuration information may include information on all or some of cell-specific/semi-static uplink signals and channels such as PRACH, SR, etc. configured in the cell (or set of cells) configured to the IAB-MT.

In another exemplary embodiment of the communication system, the first higher layer IAB-DU resource configuration information may include configuration of D/U/F slots and symbols for a cell (or set of cells) configured to the IAB-DU. The first higher layer IAB-DU resource configuration information may include HSNA type information of the IAB-DU resources configured by the upper IAB node. The first higher layer IAB-DU resource configuration information may include information on all or some of cell-specific/semi-static downlink signals and channels such as SSB, PDCCH for Type0-PDCCH CSS sets configured by pdcchConfigSIB1, CSI-RS, etc. configured in the cell (or set of cells) configured to the IAB-DU. The first higher layer IAB-DU resource configuration information may include all or some of cell-specific/semi-static uplink signals and channels such as PRACH, SR, etc. configured in the cell (or set of cells) configured to the IAB-DU.

After the step S1710, the IAB node may identify whether simultaneous DU/MT operations are possible in specific time/frequency resources. The IAB node may receive at least one of second higher layer IAB-MT resource configuration information and second higher layer IAB-DU resource configuration information from the upper node in order to determine whether to apply the simultaneous operations (S1720).

In an exemplary embodiment of the communication system, the second higher layer IAB-MT resource configuration information may be the same as or similar to the configuration information of Tables 11 to 13. The second higher layer IAB-MT resource configuration information may include configuration on whether to apply the simultaneous operation scheme to a cell, cell group (MCG or SCG), bandwidth part (BWP), or independently-configured specific frequency resources configured to the IAB-MT, or configuration for a simultaneous transmission/reception resource type. The second higher layer IAB-MT resource configuration information therefor may include information on all or some of cell-specific/semi-static downlink signals and channels such as SSB, PDCCH for Type0-PDCCH CSS sets configured by pdcchConfigSIB1, CSI-RS, etc. configured in the cell (or set of cells) configured to the IAB-MT. The second higher layer IAB-MT resource configuration information may include information on all or some of cell-specific/semi-static uplink signals and channels such as PRACH, SR, etc. configured in the cell (or set of cells) configured to the IAB-MT.

In another exemplary embodiment of the communication system, the second higher layer IAB-DU resource configuration information may include type (e.g., H. S. or NA) information of the DU/MT simultaneous operation resources configured from the upper node. For example, the second higher layer IAB-DU resource configuration information may be the same as or similar to the configuration information of Tables 11 to 13. The second higher layer IAB-DU resource configuration information may include configuration on whether to apply the simultaneous operation scheme to a cell, cell group (MCG or SCG), BWP, or independently-configured specific frequency resources configured to the IAB-DU, or configuration for a simultaneous transmission/reception resource type. The second higher layer IAB-DU resource configuration information may include information on all or some of cell-specific/semi-static downlink signals and channels such as SSB, PDCCH for Type0-PDCCH CSS sets configured by pdcchConfigSIB1, CSI-RS, etc. configured in the cell (or set of cells) configured to the IAB-DU. The second higher layer IAB-DU resource configuration information may include information on all or some of cell-specific/semi-static uplink signals and channels such as PRACH, SR, etc. configured in the cell (or set of cells) configured to the IAB-DU.

After the step S1720, in addition to the above-described higher layer configuration, the IAB node may receive at least one of a first physical layer (e.g., L1 signaling) IAB-MT resource indicator and a first physical layer IAB-DU resource indicator from the upper node (S1730). As an example, the first physical layer IAB-MT resource indicator may be a DCI format 2_0 including a slot format indicator for a cell (or set of cells) configured to the IAB-MT. As another example, the first physical layer IAB-DU resource indicator may be a DCI format 2_5 including a soft resource AI of the IAB-DU.

After the step S1730, the IAB node may receive at least one of a second physical layer (e.g., L1 signaling) IAB-MT resource indicator and a second physical layer IAB-DU resource indicator from the upper node (S1740). As an example, the second physical layer IAB-MT resource indicator may be a DCI format 2_X defined to include a simultaneous operation AI for a cell (or set of cells) configured to the IAB-MT. This may mean that the IAB-MT can determine whether to perform simultaneous DU/MT operations according to a new soft symbol availability mapping rule as shown in Table 15. Similarly, the second physical layer IAB-DU resource indicator may be a DCI format 2_X defined to include a DU/MT simultaneous operation soft resource AI for the IAB-DU (or, specific frequency resources such as cell, cell group, BWP, etc. configured to the IAB-DU). This may mean that the IAB-DU can determine whether to perform DU/MT simultaneous operations according to the new soft symbol availability mapping rule shown in Table 15.

The IAB node may determine whether to use the IAB-DU resources based on the higher layer signaling information according to the steps S1710 and S1720, and/or the physical layer (L1) signaling information according to the steps S1730 and S1740 (1750).

Second Exemplary Embodiment of Communication System

In a second exemplary embodiment of the communication system, proposed are configurations related to extension of the HSNA slot configuration and L1 signaling (e.g., DCI format 2-5, etc.) for S-type symbols, and IAB node resource management operations for simultaneous DU/MT operations based on additional configuration for whether to allow the simultaneous operations for each frequency resource.

In the second exemplary embodiment of the communication system, simultaneous DU/MT operations may be allowed based on the HSNA slot configuration described with reference to Table 7 and the like. To this end, a cell configuration (or cell configuration list) for a semi-static configuration or dynamic indication of the simultaneous DU/MT operations may be additionally configured. In other words, in addition to the HSNA slot configuration, an 'HSNA cell configuration for simultaneous operations' or 'HSNA cell configuration list for simultaneous operations' may be configured independently. The 'cell configuration' or 'cell configuration list' is merely an example for convenience of description, and exemplary embodiments of the present disclosure are not limited thereto. In an exemplary embodiment of the communication system, 'cell' in the HSNA cell configuration for simultaneous operations or HSNA cell configuration list for simultaneous operations may be replaced with other frequency resources such as 'cell group', 'BWP', other 'configured RBs', or the like. Hereinafter, in the second exemplary embodiment of the communication system, 'HSNA configuration for simultaneous operation' may refer to the above-described 'HSNA cell configuration for simultaneous operations' or 'HSNA cell configuration list for simultaneous operations'.

According to the HSNA configuration for simultaneous operations, various applications may be possible depending on situations based on a high degree of freedom in configuration. For example, in an exemplary embodiment of the communication system, the simultaneous operation scheme may be applied only to downlink H-type symbols. The ‘static configuration of the DU/MT simultaneous operation scheme’ for statically configuring the DU/MT simultaneous operation scheme may include at least one of H-type, S-type, and NA-type.

Table 16 shows a fifth exemplary embodiment of the static configuration of the DU/MT simultaneous operation scheme.

TABLE 16

| IE/Group Name | Range | IE type and reference | Semantics description |
|---|---|---|---|
| HSNA Slot Configuration List | 0..1 | | |
| >HSNA Slot Configuration Item | 1..<maxnoofHSNASlots> | | |
| >>HSNA Downlink | | ENUMERATED (H, S, NA) | HSNA value for downlink symbols in a slot. |
| >>HSNA Uplink | | ENUMERATED (H, S, NA) | HSNA value for uplink symbols in a slot. |
| >>HSNA Flexible | | ENUMERATED (H, S, NA) | HSNA value for flexible symbols in a slot. |
| HSNA Slot Configuration List for simultaneous operation | 0..1 | | |
| >HSNA Cell Configuration Item | 1..<maxnoofServingCells> | | |
| >> DU Tx / MT Tx (case A) | | ENUMERATED (H, S, NA) | HSNA value for Case A. |
| >> DU Rx / MT Rx (case B) | | ENUMERATED (H, S, NA) | HSNA value for Case B. |
| >> DU Rx / MT Tx (case C) | | ENUMERATED (H, S, NA) | HSNA value for Case C. |
| >> DU Tx / MT Rx (case D) | | ENUMERATED (H, S, NA) | HSNA value for Case D. |
| >>DU/MT FDM required (case E, optional) | | ENUMERATED (H, S, NA) | HSNA value for Case E. |
| >>DU/MT SDM required (case F, optional) | | ENUMERATED (H, S, NA) | HSNA value for Case F. |

Here, a specific relationship between the HSNA configuration according to Table 7 and the like and the HSNA configuration for simultaneous operations according to Table 16 may be defined. For example, the LAB node may be promised to apply the simultaneous operations only when the higher layer HSNA configuration according to FIGS. 7 and L1 signaling (i.e., the first L1 signaling) according thereto and the higher layer HSNA configuration according to FIG. 16 and the L1 signaling (i.e., the second L1 signaling) according thereto both indicate that the corresponding resources can be used.

Table 17 shows a sixth exemplary embodiment of the static configuration of the DU/MT simultaneous operation scheme.

TABLE 17

| IE/Group Name | Range | IE type and reference | Semantics description |
|---|---|---|---|
| HSNA Slot Configuration List | 0..1 | | |
| >HSNA Slot Configuration Item | 1..<maxnoofHSNASlots> | | |
| >>HSNA Downlink | | ENUMERATED (H, S, NA) | HSNA value for downlink symbols in a slot. |
| >>HSNA Uplink | | ENUMERATED (H, S, NA) | HSNA value for uplink symbols in a slot. |
| >>HSNA Flexible | | ENUMERATED (H, S, NA) | HSNA value for flexible symbols in a slot. |
| HSNA Slot Configuration List for simultaneous operation | 0..1 | | |
| >HSNA Cell Configuration Item | 1..<maxnoofServingCells> | | |

TABLE 17-continued

| IE/Group Name | Range | IE type and reference | Semantics description |
|---|---|---|---|
| >>HSNA Simultaneous Operation | | ENUMERATED (H, S, NA) | HSNA value for reported simultaneous operation. |

Referring to Table 17, the upper node of the IAB node (or IAB-DU and/or IAB-MT constituting the IAB node) may configure an HSNA value for each slot to the IAB node based on the information in the 'HSNA Simultaneous Operation' row of Table 17. Here, the upper node may refer to or consider the information on the simultaneous operation capability of the DU/MT reported from the IAB node based on the signaling shown in Table 9. Here, the meaning of the 'HSNA Simultaneous Operation' row may be promised between the IAB node and the upper node through the capability reporting performed in the same or different manner as in Table 9.

Operations according to the second exemplary embodiment of the communication system may be the same as or similar to those described with reference to FIG. 17.

Third Exemplary Embodiment of Communication System

In a third exemplary embodiment of the communication system, proposed are configurations related to IAB node resource management operations for simultaneous DU/MT operations based on configuration on whether to allow the simultaneous operations for each frequency resource in addition to the HSNA slot configuration and/or the L1 signaling (e.g., DCI format 2-5, etc.) for S-type symbols.

In the third exemplary embodiment of the communication system, simultaneous DU/MT operations may be allowed based on a cell configuration (or cell configuration list) separately defined in addition to the HSNA slot configuration described with reference to Table 7 and the like. Specifically, a cell configuration (or cell configuration list) for a semi-static configuration or dynamic indication of the simultaneous DU/MT operations may be additionally configured. In other words, in addition to the HSNA slot configuration, an 'HSNA cell configuration for simultaneous operations' or 'HSNA cell configuration list for simultaneous operations' may be configured independently. The 'cell configuration' or 'cell configuration list' is merely an example for convenience of description, and exemplary embodiments of the present disclosure are not limited thereto. In an exemplary embodiment of the communication system, 'cell' in the HSNA cell configuration for simultaneous operations or HSNA cell configuration list for simultaneous operations may be replaced with other frequency resources such as 'cell group', 'BWP', other 'configured RBs', or the like. Hereinafter, in the third exemplary embodiment of the communication system, 'HSNA configuration for simultaneous operation' may refer to the above-described 'HSNA cell configuration for simultaneous operations' or 'HSNA cell configuration list for simultaneous operations'.

According to the HSNA configuration for simultaneous operations, various applications may be possible depending on situations based on a high degree of freedom in configuration. For example, in an exemplary embodiment of the communication system, the simultaneous operation scheme may be applied only to downlink H-type symbols. The 'static configuration of the DU/MT simultaneous operation scheme' for statically configuring the DU/MT simultaneous operation scheme may include at least one of H-type, S-type, and NA-type.

Meanwhile, in order to indicate the HSNA configuration for simultaneous DU/MT operations for each independent frequency resource and whether to use simultaneous operation soft symbols accordingly, a new DCI format (e.g., DCI format 2_Y) or a new RNTI (e.g., FreqAI-RNTI) may be defined. The IAB node may use the newly-defined DCI format or RNTI to identify whether the related DCI indicates availability of the simultaneous operation soft symbls based on Table 8 or the like, or indicates availability of the simultaneous operation soft symbols based on the third exemplary embodiment of the communication system. As an example, the IAB node may determine whether the related DCI indicates the AI for the soft symbols in the time domain or the AI for the soft symbols in the frequency domain based on by which RNTI a CRC of the DCI is scrambled. For example, if the CRC is scrambled by an AI-RNTI, it may be determined that the related DCI indicates the AI for soft symbols in the time domain, and if the CRC is scrambled by the FreqAI-RNTI, it may indicate that the related DCI indicates the AI for soft symbols in the frequency domain.

Table 18 shows a seventh exemplary embodiment of the static configuration of the DU/MT simultaneous operation scheme.

TABLE 18

| IE/Group Name | Range | IE type and reference | Semantics description |
|---|---|---|---|
| HSNA Cell Configuration List | 0..1 | | |
| >HSNA Cell Configuration Item | 1..<maxnoofServingCells> | | |
| >>HSNA Downlink | | ENUMERATED (H, S, NA) | HSNA value for downlink symbols in a cell. |
| >>HSNA Uplink | | ENUMERATED (H, S, NA) | HSNA value for uplink symbols in a cell. |

TABLE 18-continued

| IE/Group Name | Range | IE type and reference | Semantics description |
|---|---|---|---|
| >>HSNA Flexible | | ENUMERATED (H, S, NA) | HSNA value for flexible symbols in a cell. |

Referring to Table 18, the IAB node (or IAB DU or IAB MT) may receive HSNA configuration for one or more among the simultaneous operation schemes (i.e., Cases A to D), which are defined for a configured frequency resource unit (e.g., cell in the example of Table 18). In this case, the upper IAB node or core network that configures this may need to refer to (respect) the simultaneous operation capability report of DU/MT of the IAB node as shown in Table 9. This may be understood as that the IAB node does not expect a simultaneous operation HSNA configuration value violating the simultaneous operation capability reported by the IAB node. That is, the IAB node may ignore the simultaneous operation HSNA configuration value violating the simultaneous operation capability report. The IAB node may identify time resources available for the IAB-DU and frequency resources for simultaneous DU/MT operations by referring to the time domain (e.g., slot) HSNA configuration of Table 7 and the frequency domain (e.g., cell) HSNA configuration of Table 18. The time resource available for IAB-DU and the frequency for DU/MT simultaneous operation You can check the resources.

Table 19 shows an eighth exemplary embodiment of the static configuration of the DU/MT simultaneous operation scheme.

TABLE 19

| IE/Group Name | Range | IE type and reference | Semantics description |
|---|---|---|---|
| HSNA Cell Configuration List | 0..1 | | |
| >HSNA Cell Configuration Item | 1..<maxnoofServingCells> | | |
| >> DU Tx / MT Tx (case A) | | ENUMERATED (H, S, NA) | HSNA value for Case A. |
| >> DU Rx / MT Rx (case B) | | ENUMERATED (H, S, NA) | HSNA value for Case B. |
| >> DU Rx / MT Tx (case C) | | ENUMERATED (H, S, NA) | HSNA value for Case C. |
| >> DU Tx / MT Rx (case D) | | ENUMERATED (H, S, NA) | HSNA value for Case D. |
| >>DU/MT FDM required (case E, optional) | | ENUMERATED (H, S, NA) | HSNA value for Case E. |
| >>DU/MT SDM required (case F, optional) | | ENUMERATED (H, S, NA) | HSNA value for Case F. |

Referring to Table 19, the static configuration of the DU/MT simultaneous operation scheme may be configured such that rows corresponding to the respective cases described with reference to Table 11 are included in an 'HSNA Slot Configuration Item'.

The operations according to the third exemplary embodiment of the communication system may be the same as or similar to those described with reference to FIG. 17.

Fourth Exemplary Embodiment of Communication System

In a fourth exemplary embodiment of the communication system, configurations related to a granularity of simultaneous operations are proposed.

In the fourth exemplary embodiment of the communication system, simultaneous DU/MT operations may be configured and directed for each of an IAB-DU cell and an IAB-MT cell. Alternatively, configurations for the simultaneous DU/MT operations (or configurations on whether simultaneous DU/MT operations are possible) may be configured for each cell group (e.g., MCG, SCG, etc.) including the IAB-DU and/or IAB-MT. Alternatively, configurations for the simultaneous DU/MT operations (or configurations on whether simultaneous DU/MT operations are possible) may be configured for each BWP of the IAB-DU and/or IAB-MT. Alternatively, configurations for the simultaneous DU/MT operations (or configurations on whether simultaneous DU/MT operations are possible) may be configured for each RB set/RB group composed of one or more separately configured or promised RBs.

Meanwhile, the IAB-DU and the IAB-MT may be configured to have different implementation complexities, use different transmission powers, or have different frequency resource processing capabilities. For example, the IAB-DU and the IAB-MT may have different maximum numbers of CA/DC cells. Considering the difference in implementation between the IAB-DU and the IAB-MT, configurations related to the simultaneous DU/MT operations may have different granularities for the IAB-DU and the IAB-MT. The upper node of the IAB node may transmit, to the IAB-DU and/or IAB-MT of the IAB node, a signaling related to the simultaneous operation-related configurations having different granularities for the IAB-DU and the IAB-MT.

In an exemplary embodiment of the communication system, the upper node of the IAB node may configure the simultaneous DU/MT operations for the IAB-DU constituting the IAB node for each cell, and configure the simultaneous DU/MT operation for the IAB-MT constituting the IAB node for each BWP. For example, the interference processing capability of the IAB-MT may be relatively limited compared to the interference processing capability of the IAB-DU, and thus the simultaneous DU/MT operation for the IAB-MT may be configured in more detail than the simultaneous DU/MT operation for the IAB-DU. However, this is only an example for convenience of description, and exemplary embodiments of the present disclosure are not limited thereto. For example, in another exemplary embodiment of the communication system, different units respectively applied to the IAB-DU and the IAB-MT may be combined in more various manners.

Fifth Exemplary Embodiment of Communication System

In a fifth exemplary embodiment of the communication system, configurations related to cell-specific signals and channels are proposed.

In the fifth exemplary embodiment of the communication system, the IAB-DU may transmit and receive signals under assumption that the type of symbols that do not affect a signal transmission/reception direction of the IAB-MT, or the type of symbols through which a cell-specific/semi-static signal or channel is transmitted/received is the H-type. Here, the cell-specific/semi-static signal or channel may follow the above description, such as SSB, PDCCH for Type0-PDCCH CSS sets configured by pdcchConfigSIB1, CSI-RS, PRACH, SR, and/or the like.

Here, the above-described IAB-DU and/or IAB-MT operations may be extended for the IAB node capable of performing simultaneous DU/MT operations. For example, with respect to the IAB node that has performed capability reporting based on one or more of the above-described Cases A to D (or Cases A to F), the IAB-MT of the corresponding IAB node may be configured to transmit and receive signals even in symbols in which the IAB-DU transmits and receives a cell-specific/semi-static signal or channel.

Sixth Exemplary Embodiment of Communication System

In a sixth exemplary embodiment of the communication system, additional configurations for implementation of the first to fifth exemplary embodiments of the communication system are proposed.

In an exemplary embodiment of the communication system, the maximum number of blind decodings (BD) and control channel elements (CCEs) that the terminal needs to decode in a specific time period may be configured or defined for a purpose of limiting PDCCH reception complexity of a terminal. For example, when the number of configured CA or DC cells is 4 or less, the terminal may assume the total number of BD/CCEs by multiplying a predetermined maximum number of BD/CCEs for each cell and the number of configured cells. However, when the number of configured CA or DC cells is more than 5, the PDCCH reception may be performed by dividing the maximum number of BD/CCEs that the terminal can process, which is reported by the terminal, by the number of configured cells. This has an effect of preventing the PDCCH detection complexity from increasing to more than a predetermined value when the CA and/or DC is performed with a large number of cells.

Meanwhile, according to the first to fifth exemplary embodiments of the communication system, it may be assumed that simultaneous DU/MT operations are not allowed in some of the cells configured for the IAB-MT and simultaneous DU/MT operations are allowed in the remaining cells. In this case, since a required control channel capacity may be larger for cells in which simultaneous DU/MT operations are allowed, it may be possible to promise to distribute the number of BD/CCEs by assuming that the simultaneous DU/MT operations are not allowed in one cell, and the simultaneous DU/MT operations are allowed in two or more cells (e.g., 1.5 or 2 cells).

Seventh Exemplary Embodiment of Communication System

In a seventh exemplary embodiment of the communication system, configurations related to extension of the HSNA slot configuration and the DCI formats 2-5 for implementing one or more of the first to third exemplary embodiments of the above-described communication system are proposed.

In the first to third exemplary embodiments, methods for configuring IAB node resources for simultaneous DU/MT operations by extending the conventional type configuration (HSNA slot configuration) and L1 signaling for soft symbols (i.e., DCI format 2-5) for time resources have been provided. In applying the above-described methods, the following details may be referred to.

An example of the conventional method of extending the type configuration (HSNA slot configuration, see Table 7) for time resources, a slot configuration (or slot configuration list) for semi-static configuration and dynamic indication of simultaneous DU/MT operations may be added. This may mean that the 'HSNA slot configuration list for simultaneous operations' or 'HSNA slot configuration for simultaneous operations' may be independently configured for the simultaneous DU/MT operations in addition to the HSNA slot configuration. In this case, the terms such as 'HSNA slot configuration list for simultaneous operations' or 'HSNA slot configuration for simultaneous operations' for simultaneous DU/MT operations other than 'HSNA slot configuration' are merely examples for convenience of description, and exemplary embodiments of the present disclosure are not limited thereto. For example, various schemes, for example, a scheme in which the conventional HSNA slot configuration is configured as first configuration, and second or more HSNA slot configuration(s) for simultaneous operations are additionally configured for one cell (or CC or carrier), may be applied. Each of the above-described second to more HSNA slot configuration(s) may include configuration information of a frequency resource (BWP, configured RBs, RB group, or the like) to which the configuration is applied within one cell (or CC or carrier). In the following description, for convenience of description, this may be referred to as 'HSNA configuration for simultaneous operations'. The HSNA configuration for simultaneous operations, independent of the conventional HSNA configuration, may enable various applications according to situations (e.g., simultaneous operations are applied only to downlink H-type symbols, etc.) based on a high degree of freedom in configuration. Such the exemplary embodiment (i.e., applying simultaneous operations only to downlink H-type symbols) may be an operation under the assumption that the IAB node can manage interferences due to the simultaneous operations easily in the downlink H-type symbols of the IAB-DU, and not easily in the downlink S-type or NA-type resources. The detailed and various operations according thereto will be described below. The static configuration of simultaneous DU/MT operations may include at least one of 1) the H-type meaning that at least one operation among Cases A to D can be applied regardless of L1 signaling. 2) the NA-type meaning that simultaneous DU/MT operations are impossible regardless of L1 signaling, or 3) the soft-type meaning that simultaneous DU/MT operations are indicated by L1 signaling.

Eighth Exemplary Embodiment of Communication System

In an eighth exemplary embodiment of the communication system, configurations related to a resource type configuration method and/or a signaling method for implementing one or more of the first to seventh exemplary embodiments of the above-described communication system are proposed.

In the eighth exemplary embodiment, other examples for applying the above-described type configuration (HSNA slot configuration and/or HSNA slot configuration for simultaneous operations) for time-frequency resources and L1 signaling (i.e., DCI format 2_5) for soft symbols are provided.

As described above, a certain IAB node may be configured with 1) a time resource type configuration (HSNA slot configuration, HSNA configuration #1) (for a certain DU cell), and 2) a time-frequency resource type configuration (HSNA cell configuration for simultaneous operations, HSNA configuration #2) (for a specific RB set within the certain DU cell).

If an IAB node (i.e., IAB DU) is configured with only one of the HSNA configuration #1 and the HSNA configuration #2 for a specific OFDM symbol, the IAB node (i.e., IAB DU) may apply the received HSNA configuration to the corresponding OFDM symbol.

If an IAB node (i.e., IAB DU) is configured with both the HSNA configuration #1 and the HSNA configuration #2 for a specific OFDM symbol, the IAB node (i.e., IAB DU) may select one HSNA configuration according to a specific rule, and apply the selected HSNA configuration to the OFDM symbol. The above-mentioned specific rule may be promised to be explicitly configured through an independent higher layer parameter, or defined as a rule implicitly determined by whether parameter(s) configured for simultaneous DU/MT operations are configured.

Here, the 'implicitly determined rule' may consider at least one of 1) whether the IAB node performs (capability) reporting on whether to support simultaneous DU/MT transmission/reception operations (for each time/frequency resource), 2) whether D-U directions of the DU and MT collide, 3) whether a transmission timing adjustment (or a specific timing adjustment value/timing mode) of the IAB-DU or MT is applied, or 4) semi-static/cell-specific signal configuration (or whether HSNA resources collide accordingly).

The second HSNA configuration (i.e., HSNA configuration #2) may have different values for downlink (D), flexible (F), and uplink (U) symbols within a certain slot. For example, D symbols within a certain slot may be assigned an HSNA configuration value #2-1. F symbols within the slot may be assigned an HSNA configuration value #2-2, and U symbols within the slot may be assigned an HSNA configuration value #2-3. The HSNA configuration values #2-1, #2-2, to #2-3 may include HSNA configuration for the same frequency resource (e.g., RB set, RB group (RBG), precoding resource block group (PRB), BWP, or a set thereof) or HSNA configuration for frequency resources that are different or partially shared (within the DU cell or a pair of {DU cell, MT CC}).

The second HSNA configuration (i.e., HSNA configuration #2) may provide an HSNA configuration for time-frequency resources assuming a specific SCS. The specific SCS may be determined by an independent higher layer parameter or may be determined according to an SCS of the cell (i.e., DU cell, MT CC, a pair of {DU cell, MT CC}) or a BWP including the corresponding HSNA configuration #2. If the HSNA configuration #2 is applied to time-frequency resources to which an SCS different from the specific SCS is applied, the IAB node (IAB DU, IAB MT) may appropriately adjust the time-frequency resources to which the HSNA configuration #2 is applied according to the above-described relationship between numerologies.

If a DFU symbol direction (i.e., symbol direction #1) determined by a DFU configuration within the second HSNA configuration (HSNA configuration #2) according to an SCS #1 collides with a DFU symbol direction (i.e., symbol direction #2) determined by a DFU configuration (e.g., tdd-UL-DL-ConfigurationCommon, tdd-UL-DL-ConfigurationDedicated, tdd-UL-DL-ConfigurationDedicated-IAB-MT, etc.) or an indication (e.g., DCI format 2_0) according to a different SCS #2, the corresponding IAB node may select one DFU symbol direction according to a specific rule. The specific rule may be configured to one of two rules through an independent parameter. As another example, the above-mentioned specific rule may be one that is promised in advance to preferentially select a specific symbol direction. For example, considering that the symbol direction #2 is configured or indicated cell-specifically (via tdd-UL-DL-ConfigurationCommon, etc.) or group-specifically (via DCI format 2_0, etc.) in many cases, the DFU symbol direction may be promised to be determined based on the symbol direction #2.

In order to indicate whether to use soft symbols or time/frequency resources according to the HSNA configuration #1 and the HSNA configuration #2 through the DCI format 2_5, six types of resources may be defined as follows.

Type #1 resource: DL soft symbol configured by HSNA configuration #1

Type #2 resource: Flexible soft symbol configured by HSNA configuration #1

Type #3 resource: UL soft symbol configured by HSNA configuration #1

Type #4 resource: DL soft (time/frequency/beam) resource configured by HSNA configuration #2

Type #5 resource: Flexible soft (time/frequency/beam) resource configured by HSNA configuration #2

Type #6 resource: UL soft (time/frequency/beam) resource configured by HSNA configuration #2

The above-described definitions of types #1 to #6 are merely examples for convenience of description, and exemplary embodiments of the present disclosure are not limited thereto. For example, in an exemplary embodiment of the communication system, all of time, frequency, and beam are not specified in the types #4 to #6, but some time-frequency resources or some beams may be specified.

Table 20 shows a first exemplary embodiment of a mapping relationship between availability indicator (AI) index field values based on the aforementioned resource types #1 to #6 and availability of soft resources.

TABLE 20

| Value | Indication |
| --- | --- |
| 0 | No indication of availability for soft symbols/resources |
| 1 | Type #1 resources are indicated available<br>No indication of availability for other resource types |

TABLE 20-continued

| Value | Indication |
| --- | --- |
| 2 | Type #3 resources are indicated available<br>No indication of availability for other resource types |
| 3 | Type #1 and #3 resources are indicated available<br>No indication of availability for other resource types |
| 4 | Type #2 resources are indicated available<br>No indication of availability for other resource types |
| 5 | Type #1 and #2 resources are indicated available<br>No indication of availability for other resource types |
| 6 | Type #2 and #3 resources are indicated available<br>No indication of availability for other resource types |
| 7 | Type #1, #2, and #3 resources are indicated available<br>No indication of availability for other resource types |
| 8 | Type #1 and #4 resources are indicated available<br>No indication of availability for other resource types |
| 9 | Type #3 and #6 resources are indicated available<br>No indication of availability for other resource types |
| 10 | Type #1, #3, #4, and #6 resources are indicated available<br>No indication of availability for other resource types |
| 11 | Type #2, and #5 resources are indicated available<br>No indication of availability for other resource types |
| 12 | Type #1, #2, #4, and #5 resources are indicated available<br>No indication of availability for other resource types |
| 13 | Type #2, #3, #5, and #6 resources are indicated available<br>No indication of availability for other resource types |
| 14 | Type #1, #2, #3, #4, #5, and #6 resources are indicated available |
| 15 | Reserved |

The mapping relationship shown in Table 20 may include the mapping relationship shown in Table 8 or the like. To this end, in an exemplary embodiment of the communication system, a payload of each AI index field of DCI format 2_5 may be extended from 3 bits to 4 bits. According to Table 20, the upper IAB node may not only indicate the conventional operation (i.e., operation of indicating whether to use D/U/F soft symbols of the IAB-DU based on the DU/MT TDM operation) by using the values 0 to 7, but also indicate whether to use simultaneous operation soft symbols based on a DU/MT FDM or SDM operation by using the values 8 to 14. The operation corresponding to the values 8 to 14 of Table 20 may be characterized in indicating whether soft symbols/resources according to the HSNA configuration #2 overlapping soft symbols/resources according to the HSNA configuration #1 are used, in addition to indication of the operation indicated by the values 1 to 7 (i.e., indicating whether soft symbols/resources according to the HSNA configuration #1 are used). In this case, the IAB node may need a criterion for determining whether to follow the mapping of Table 8 or the mapping of Table 20, and thus the IAB node may implicitly follow the mapping of Table 8 based on whether the HSNA configuration #2 has been received, reported information on whether the simultaneous DU/MT operations are possible or preferred, or the like. Alternatively, a higher layer parameter explicitly indicating whether to follow the mapping of Table 8 or the mapping of Table 20 may be introduced. It should be noted that in Table 20, the order of the values and the meanings mapped thereto is not an important factor, and some of the values may be changed or omitted in actual application.

As another method for supporting the mapping relationship between the AI index field value based on the resource type and the availability of the corresponding soft resource, the above-described DCI format 2_5 may be extended. The CRC of the extended DCI format 2_5 may be scrambled with an AI-RNTI, and the DCI format 2-5 may include the following information.

In this case, the AI 1-X may indicate whether to use the soft symbol/resource configured by the HSNA configuration #1 according to the mapping in Table 8, and the AI 2-X may indicate whether the soft symbol/resource configured by the HSNA configuration #2 according to the mapping table 21.

Meanwhile, Table 21 shows a second embodiment of the mapping relationship between the AI index field values based on the aforementioned resource types #1 to #6 and availability of the soft resources.

TABLE 21

| Value | Indication |
| --- | --- |
| 0 | No indication of availability for type #4, #5, and #6 resources |
| 1 | Type #4 resources are indicated available<br>No indication of availability for type #5, and #6 resources |
| 2 | Type #6 resources are indicated available<br>No indication of availability for type #4, and #5 resources |
| 3 | Type #4 and #6 resources are indicated available<br>No indication of availability for type #5 resources |
| 4 | Type #5 resources are indicated available<br>No indication of availability for type #4, and #6 resources |
| 5 | Type #4 and #5 resources are indicated available<br>No indication of availability for type #6 resources |
| 6 | Type #5 and #6 resources are indicated available<br>No indication of availability for type #4 resources |
| 7 | Type #4, #5, and #6 resources are indicated available |

Referring to Table 21, the upper node of the IAB node may indicate to the IAB node whether or not to use the soft symbols/resources according to the HSNA configuration #1 and the HSNA configuration #2 at once based on one DCI format 2_5. The size of the extended DCI format 2_5 may be configured to have a value different from that of the conventional DCI format 2_5 (e.g., greater than 128 bits at most) through a higher layer parameter.

Table 22 shows a third exemplary embodiment of the mapping relationship between the AI index field values based on the aforementioned resource types #1 to #6 and availability of the soft resources.

TABLE 22

| Value | Indication |
| --- | --- |
| 0 | No indication of availability for soft symbols/resources |
| 1 | Type #1 resources are indicated available<br>No indication of availability for other resource types |
| 2 | Type #3 resources are indicated available<br>No indication of availability for other resource types |
| 3 | Type #1 and #3 resources are indicated available<br>No indication of availability for other resource types |
| 4 | Type #2 resources are indicated available<br>No indication of availability for other resource types |
| 5 | Type #1 and #2 resources are indicated available<br>No indication of availability for other resource types |
| 6 | Type #2 and #3 resources are indicated available<br>No indication of availability for other resource types |
| 7 | Type #1, #2, and #3 resources are indicated available<br>No indication of availability for other resource types |
| 8 | Type #4 resources are indicated available<br>No indication of availability for other resource types |
| 9 | Type #6 resources are indicated available<br>No indication of availability for other resource types |
| 10 | Type #4, and #6 resources are indicated available<br>No indication of availability for other resource types |
| 11 | Type #5 resources are indicated available<br>No indication of availability for other resource types |
| 12 | Type #4, and #5 resources are indicated available<br>No indication of availability for other resource types |
| 13 | Type #5, and #6 resources are indicated available<br>No indication of availability for other resource types |
| 14 | Type #4, #5, and #6 resources are indicated available<br>No indication of availability for other resource types |
| 15 | Reserved. |

Referring to Table 22, the new mapping relationship may extend each AI index field payload in the DCI format 2_5 from 3 bits to 4 bits in order to include the conventional mapping relationship of Table 8. According to Table 22, the upper IAB node may not only indicate the conventional operations (i.e., operations of indicating whether to use the D/U/F soft symbols of the IAB-DU based on the DU/MT TDM operations) by using the values 0 to 7, but also indicate whether to use simultaneous operation soft symbols based on the DU/MT FDM or SDM operation by using the values 8 to 15. The operations corresponding to the values 8 to 14 of Table 22 may indicate whether to use soft symbols/resources according to HSNA configuration #2. exclusively from operations (i.e., indicating whether to use soft symbols/resources according to the HSNA configuration #1) indicated by the values 1 to 7. That is, it may be understood that the lower IAB node is indicated to stop the DU/MT TDM operation and perform the simultaneous DU/MT operations (FDM/SDM operation) when the operation corresponding to the values 8 to 14 of Table 22 is indicated. In this case, the IAB node may need a criterion for determining whether to follow the mapping of Table 8 or the mapping of Table 20. For example, the IAB node may implicitly follow the mapping of Table 8 according to whether the HSNA configuration #2 is received or information on whether simultaneous DU/MT operations are possible or preferred. Alternatively, a higher layer parameter that explicitly indicates whether the IAB node follows the mapping of Table 8 or the mapping of Table 21 may be introduced. It should be noted that in Table 22, the order of the values and the meanings mapped thereto is not an important factor, and some of the values may be changed or omitted in actual application.

On the other hand, the upper IAB node may need to indicate an AI that does not violate with information on whether the simultaneous operations are supported or preferred (i.e., information on which cases among Cases A to F are supported or preferred, and information on whether a power control, beam management, resource configuration, and/or guard symbol/band are required), which is repored by the lower IAB node (i.e., IAB DU, IAB MT). For example, the violation may be understood as a case in which soft symbols/resources that the upper node indicates as available include time/frequency/space (beam) resources reported/indicated as not preferred for the simultanoues DU/MT operations.

If the AI indicated by the upper IAB node through the DCI format 2_5 violates the information on whether the simultaneous operations are supported or preferred (i.e., information on which cases among Cases A to F are supported or preferred, and information on whether a power control, beam management, resource configuration, and/or guard symbol/band are required), which is reported/indicated by the lower IAB node (IAB DU, IAB MT), the lower IAB node may select at leat one of various solutions such as 1) a scheme of ignoring the AI indication, 2) a scheme of operating preferentially based on the information on whether the simultaneous operations are supported or preferred, or 3) a scheme of being guaranteed to be able to freely select according to the implementation of the lower IAB node.

For coexistence between the IAB node supporting simultaneous DU/MT operations and a terminal, the following methods may be additionally considered in addition to the above-described exemplary embodiments. As an example, a certain IAB node or a DU or MT within the IAB node may be configured to exclude application of simultaneous operation configuration such as FDM and SDM within some portion within a slot (e.g., first N symbols within the slot) in order to ensure a control channel transmission bandwidth for legacy terminals. As another example, a certain IAB node or a DU or MT within the IAB node may be guaranteed or configured not to perform the simultaneous DU/MT operations in N symbols before and after a cell-specific or semi-specific signal/channel.

The 'first HSNA slot configuration' may be understood to be applied to one DU cell, and the 'second or more HSNA slot configurations' may be 1) configured for each MT of an IAB node including the corresponding DU, 2) configured for each MT cell of the IAB node including the corresponding DU, or 3) configured for each beam of the corresponding DU.

It is possible for the IAB node to update capability reports to the CU or parent node. This may be understood that the IAB node may be able to override information on whether DU/MT simultaneous transmission and receptions of MT(s) included in the IAB node are possible, which is previously reported by the IAB node to the CU or parent node. The IAB node may update information on whether TDM, FDM, or SDM is supported or preferred in a specific time resource through this. In this case, in order to match the understandings of the CU, parent node, and IAB node on which IAB capability report value is applied from when, it may be required to define an application timing of the IAB capability report. As an example therefor, the content of the corresponding IAB capability report may be promised or configured to be applied after a lapse of a specific time (e.g., N symbols, N slots, N ms, etc.) from a reception time of an ACK for an FIAP including the IAB capability report, or may be promised or configured to be applied after a lapse of a specific time (e.g., N symbols, N slots, N ms, etc.) from a transmission time of the F1AP including the IAB capability report.

In order to support the above-described DU/MT simultaneous transmission/reception operations for each frequency resource, the report of multiplexing information of the IAB node may be updated to include information on specific frequency resources within one MT cell (CC) (i.e., the multiplexing information may be extended to include the specific frequency resources within the cell) or include information on specific time resources (i.e., the multiplexing information may be extended to limit from which time point to which time point it is applied). Based thereon, the CU or parent node may identify whether TDM/FDM/SDM is applicable between resources of an access link and resources of an backhaul link. In this case, the above-described time resource information may be defined as a supportable multiplexing (TDM/FDM/SDM) pattern that is repeated in units of several OFDM symbols, slots, or ms (e.g., TDM/FDM/SDM pattern such as 'TTFFTTSSFF' repeated every 10 slots).

The configurations described through the first to eighth exemplary embodiments of the communication system are not necessarily mutually exclusive, and configurations proposed in a plurality of exemplary embodiments may be applied in combination. For example, the IAB node may be implemented such that the resource management method according to the first exemplary embodiment and the BD/CCE distribution method according to the sixth exemplary embodiment are applied at the same time. As another example, the IAB node may be implemented such that the frequency domain DU/MT simultaneous operation configuration method according to one of the first to third exemplary embodiments, and the simultaneous operation unit determination method according to the fourth exemplary embodiment are applied at the same time. The IAB node may report information on which of the features or functions according to the first to eighth exemplary embodiments are implemented or not implemented to the upper node. The upper node may indicate what operation the IAB node will perform based on this through L1 signaling or higher layer signaling.

Figure 18:
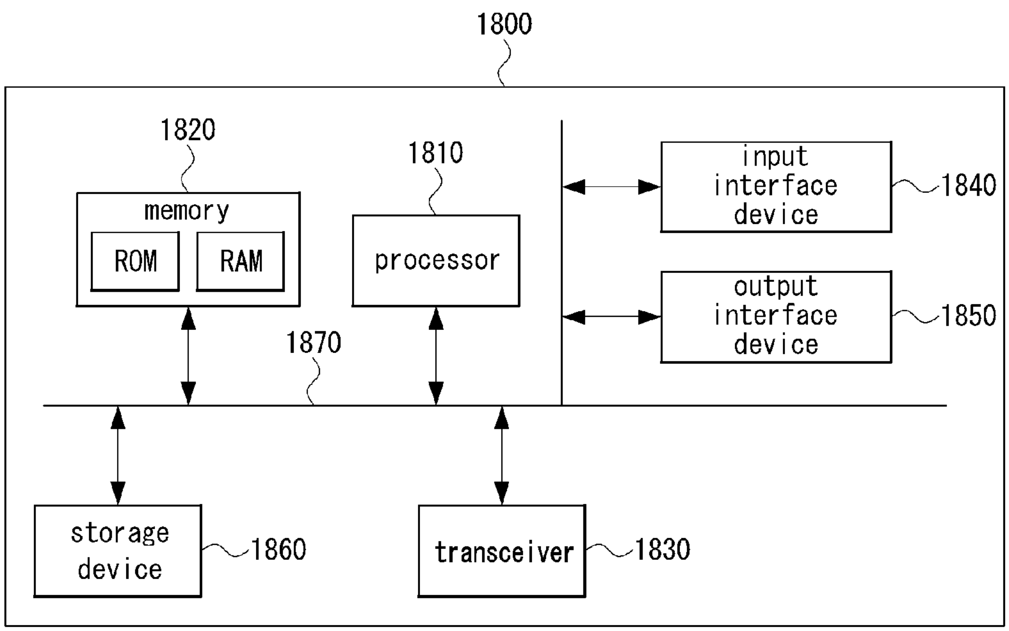
FIG. 18 is a conceptual diagram illustrating an exemplary embodiment of a communication node in a communication system.

FIG. 18 is a block diagram illustrating an exemplary embodiment of a communication node constituting a communication system.

Referring to FIG. 18, a communication node 1800 may comprise at least one processor 1810, a memory 1820, and a transceiver 1830 connected to the network for performing communications. Also, the communication node 1800 may further comprise an input interface device 1840, an output interface device 1850, a storage device 1860, and the like. The respective components included in the communication node 1800 may communicate with each other as connected through a bus 1870.

However, each component included in the communication node 1800 may be connected to the processor 1810 via an individual interface or a separate bus, rather than the common bus 1870. For example, the processor 1810 may be connected to at least one of the memory 1820, the transceiver 1830, the input interface device 1840, the output interface device 1850, and the storage device 1860 via a dedicated interface.

The processor 1810 may execute a program stored in at least one of the memory 1820 and the storage device 1860. The processor 1810 may refer to a central processing unit (CPU), a graphics processing unit (GPU), or a dedicated processor on which methods in accordance with embodiments of the present disclosure are performed. Each of the memory 1820 and the storage device 1860 may be constituted by at least one of a volatile storage medium and a non-volatile storage medium. For example, the memory 1820 may comprise at least one of read-only memory (ROM) and random access memory (RAM).

The communication node 1800 may correspond to any one of communication nodes constituting the exemplary embodiments of the communication system described with reference to FIGS. 1 to 17. In an exemplary embodiment of the communication system, the communication node 1800 may correspond to the IAB node. For example, the communication node 1800 may perform the same or similar operations to those of the IAB node described with reference to FIGS. 13 to 17. The processor 1810 of the communication node 1800 may execute instructions for operations for communications with an upper node or a lower node of the IAB node.

On the other hand, the communication node 1800 may correspond to an IAB-DU. For example, the communication node 1800 may perform the same or similar operations to those of the IAB-DU described with reference to FIGS. 13 to 17. The processor 1810 of the communication node 1800 may control radio signal transmission and reception operations of the transceiver 1830 of the IAB-DU, which includes a transmitter and a receiver. The processor 1810 of the communication node 1800 may determine whether the communication node 1800 can use resources, and perform communications with other communication nodes based on a result of the determination.

On the other hand, the communication node 1800 may correspond to an IAB-MT. For example, the communication node 1800 may perform the same or similar operations to those of the IAB-MT described with reference to FIGS. 13 to 17. The processor 1810 of the communication node 1800 may control radio signal transmission and reception operations of the transceiver 1830 of the IAB-MT, which includes a transmitter and a receiver. The processor 1810 of the communication node 1800 may determine whether the communication node 1800 can use resources, and perform communications with other communication nodes based on a result of the determination.

According to an exemplary embodiment of the present disclosure, an IAB-MT and an IAB-DU included in an IAB node may perform communications with an upper node and a lower node, respectively, according to the TDD scheme or the simultaneous operation scheme. The upper node such as an IAB donor of the IAB node may deliver, to the IAB node, resource configuration information (or resource indicator) indicating information of resources allocated for each of the IAB-DU and the IAB-MT in form of the TDM scheme, FDM scheme. SDM scheme, and/or the like. Signals such as a DCI, F1AP, and/or the like may be extended and used for transmission of the resource configuration information (or resource indicator) delivered from the upper node of the IAB node to the IAB node. Accordingly, the efficiency of communications through the IAB node can be improved, the coverage thereof can be expanded, and the communication capacity thereof can be increased.

However, the effects that can be achieved by the resource management method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A resource management method performed by an integrated access and backhaul (IAB) node in a communication system, the resource management method comprising:

obtaining, based on at least one higher layer signaling signal received from an upper node of the IAB node, first information for resource configuration of the IAB node;

obtaining, based on the at least one higher layer signaling signal received from the upper node, second information for resource configuration of the IAB node; and determining a multiplexing communication of an IAB-mobile terminal (MT) and an IAB-distributed unit (DU) constituting the IAB node based on at least one of the first information and the second information, wherein in the determining, the IAB node determines whether frequency division multiplexing is applied to the multiplexing communication of the IAB-MT and the IAB-DU.

2. The resource management method according to claim 1, wherein the first information includes at least one of information on a communication direction configured for the IAB-MT and information on a communication direction configured for the IAB-DU in a time domain, and the communication direction includes at least one of downlink (DL), uplink (UL), flexible and a combination thereof.

3. The resource management method according to claim 1, wherein the first information includes at least one of a hard/soft/not-available (HSNA) configuration configured for the IAB-MT and an HSNA configuration configured for the IAB-DU in a time domain.

4. The resource management method according to claim 1, wherein the second information includes information on a simultaneous operation (SO) scheme of the IAB-DU and the IAB-MT.

5. The resource management method according to claim 4, wherein the information on the simultaneous operation scheme includes at least one of:

a first case in which both the IAB-DU and the IAB-MT perform transmissions;

a second case in which both the IAB-DU and the IAB-MT perform receptions;

a third case in which the IAB-DU performs reception and the IAB-MT performs transmission;

a fourth case in which the IAB-DU performs transmission and the IAB-MT performs reception; and a fifth case in which radio resources used by the IAB-DU and the IAB-MT are multiplexed in the frequency division scheme.

6. The resource management method according to claim 1, wherein the first information includes at least one of an HSNA configuration configured for the IAB-MT and an HSNA configuration configured for the IAB-DU in a frequency domain.

7. The resource management method according to claim 1, further comprising, before the determining, receiving, from the upper node, at least one physical layer signaling signal for resource configuration of the IAB node, wherein in the determining, the IAB-MT and the IAB-DU are determined to perform communications by being multiplexed, based on at least one of the first information, the second information and the at least one physical layer signaling signal.

8. The resource management method according to claim 7, wherein the at least one physical layer signaling signal includes information related to an availability indicator (AI) for a soft resource of the IAB-MT or the IAB-DU.

9. The resource management method according to claim 8, wherein the information related to the AI for the soft resource includes information on availability of at least one of a DL soft resource, a UL soft resource, a flexible soft resource and a simultaneous operation (SO) soft resource.

10. The resource management method according to claim 8, wherein the information related to the AI for the soft resource includes information related to an HSNA configuration configured for at least one of the IAB-MT and IAB-DU in a frequency domain included in the first information.

11. A resource management method performed by a first communication node in a communication system, the resource management method comprising:

generating at least one higher layer signaling signal including first information and second information for resource configuration of an integrated access and backhaul (IAB) node that is a lower node of the first communication node;

transmitting, to the IAB node, the at least one higher layer signaling signal; and performing communication with the IAB node based on a multiplexing communication determined by the IAB node based on at least one of the first information and the second information, wherein the multiplexing communication is a communication based on multiplexing of an IAB-mobile terminal (MT) and an IAB-distributed unit (DU) constituting the IAB node, and whether frequency division multiplexing is applied to the multiplexing communication of the IAB-MT and the IAB-DU is determined based on at least one of the first information and the second information.

12. The resource management method according to claim 11, wherein the first information includes at least one of information on a communication direction configured for the IAB-MT and information on a communication direction configured for the IAB-DU in a time domain, and the communication direction includes at least one of downlink (DL), uplink (UL), flexible and a combination thereof.

13. The resource management method according to claim 11, wherein the first information includes at least one of a hard/soft/not-available (HSNA) configuration configured for the LAB-MT and an HSNA configuration configured for the IAB-DU in a time domain.

14. The resource management method according to claim 11, wherein the second information includes information on a simultaneous operation (SO) scheme of the IAB-DU and the IAB-MT.

15. The resource management method according to claim 14, wherein the information on the simultaneous operation scheme includes at least one of:

a first case in which both the IAB-DU and the IAB-MT perform transmissions;

a second case in which both the IAB-DU and the IAB-MT perform receptions;

a third case in which the IAB-DU performs reception and the IAB-MT performs transmission;

a fourth case in which the IAB-DU performs transmission and the IAB-MT performs reception; and a fifth case in which radio resources used by the IAB-DU and the IAB-MT are multiplexed in the frequency division scheme.

16. The resource management method according to claim 11, wherein the first information includes at least one of an HSNA configuration configured for the IAB-MT and an HSNA configuration configured for the IAB-DU in a frequency domain.

17. The resource management method according to claim 11, further comprising, before the performing, transmitting, to the IAB node, at least one physical layer signaling signal for resource configuration of the IAB node.

18. The resource management method according to claim 17, wherein the at least one physical layer signaling signal includes information related to an availability indicator (AI) for a soft resource of the IAB-MT or the IAB-DU.

19. The resource management method according to claim 18, wherein the information related to the AI for the soft resource includes information on availability of at least one of a DL soft resource, a UL soft resource, a flexible soft resource and a simultaneous operation (SO) soft resource.

20. The resource management method according to claim 18, wherein the information related to the AI for the soft resource includes information related to an HSNA configuration configured for at least one of the IAB-MT and IAB-DU in a frequency domain included in the first information.

* * * * *